Figure 1:
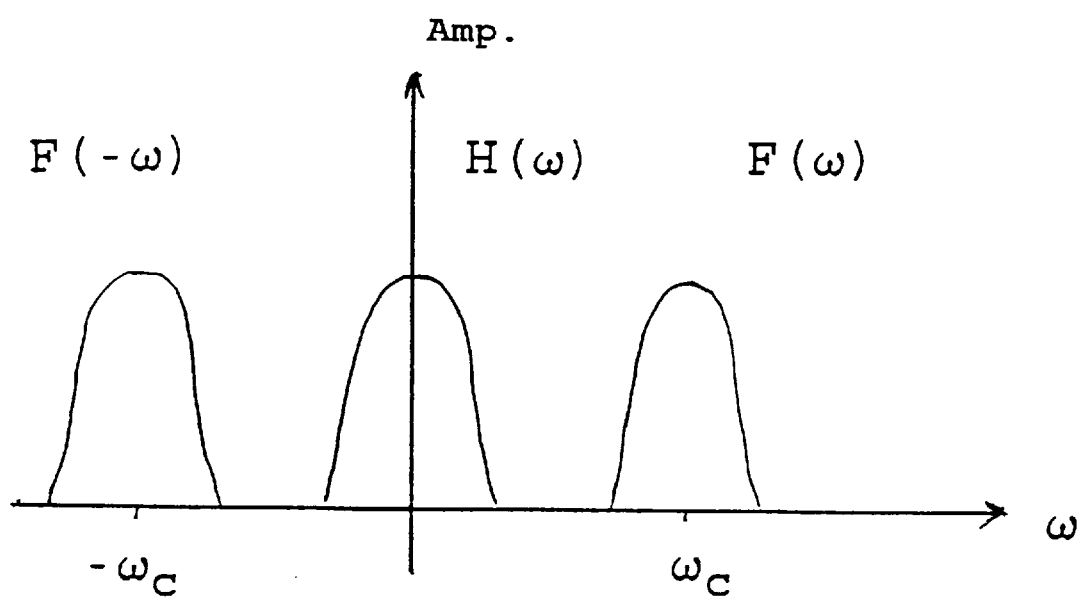

United States Patent
Leonhard

[19]
[11] Patent Number: 5,884,260
[45] Date of Patent: Mar. 16, 1999

[54] METHOD AND SYSTEM FOR DETECTING AND GENERATING TRANSIENT CONDITIONS IN AUDITORY SIGNALS

[76] Inventor: Frank Uldall Leonhard, Louisevej 13, DK-2800, Lyngby, Denmark

[21] Appl. No.: 537,844
[22] PCT Filed: Apr. 22, 1994
[86] PCT No.: PCT/DK94/00164
§ 371 Date: Dec. 12, 1995
§ 102(e) Date: Dec. 12, 1995
[87] PCT Pub. No.: WO94/25958
PCT Pub. Date: Nov. 10, 1994

[30] Foreign Application Priority Data

Apr. 22, 1993 [DK] Denmark .................... 0464/93

[51] Int. Cl.[6] ........................................... G10L 5/06
[52] U.S. Cl. ................. 704/254; 704/211; 704/243; 704/276
[58] Field of Search ................ 704/276, 243, 704/223, 254, 249, 215, 214, 211, 253, 248

[56] References Cited

U.S. PATENT DOCUMENTS

| | | | |
|---|---|---|---|
| 3,838,217 | 9/1974 | Dreyfus | 704/225 |
| 3,855,418 | 12/1974 | Fuller | 179/1 |
| 3,919,479 | 11/1975 | Moon | 179/1 |
| 3,940,565 | 2/1976 | Lindenberg | 179/1 |
| 3,946,157 | 3/1976 | Dreyfus | 704/254 |
| 4,701,953 | 10/1987 | White | 381/46 |
| 4,817,155 | 3/1989 | Briar et al. | 704/203 |

(List continued on next page.)

FOREIGN PATENT DOCUMENTS

| | | |
|---|---|---|
| 0107945 | 3/1987 | European Pat. Off. . |
| 1248593 | 12/1987 | European Pat. Off. . |
| 0311808 | 4/1989 | European Pat. Off. . |
| 2348888 | 1/1990 | European Pat. Off. . |
| 0237934 | 1/1992 | European Pat. Off. . |
| 243562 | 1/1992 | European Pat. Off. . |
| 2720666 | 11/1978 | Germany . |

(List continued on next page.)

OTHER PUBLICATIONS

J. N. Holmes, "Speech Synthesis and Recognition," Chapman and Hall, London, 1988, pp. 54–60 and 71.
"Microsoft Press Computer Dictionary," second ed., 1994, p.345.
"Principles of circuit Synthesis", McGraw–Hill 1959, Ernest S. Kuh and Donald O. Pederson. pp. 6–21.

*Primary Examiner*—David R. Hudspeth
*Assistant Examiner*—Donald L. Storm

[57] ABSTRACT

The shape of energy changes of an auditory signal is used for identifying or representing features which can be perceived by a human ear as representing a distinct sound picture. In order to extract information from the shape of the energy changes, the shape is preferably represented by the shape of a transient pulse of the signal with a rise time of at most 2 ms. It is preferred that an envelope detection is being used in order to obtain the transient signal pulse. The energy change representing the distinct sound picture can be a phoneme or vowel. The invention also relates to a method for identifying the energy changes in the auditory signal by comparing the shape of energy changes of the signal, which can be represented as the shape of the transient pulse, with predetermined energy change shapes representing distinct sound pictures. The invention also relates to a method of speech synthesis wherein a series of transient pulses is generated corresponding to the series of phonemes to be synthesized. The invention further relates to a system for processing an auditory signal in order to reduce the bandwidth of the signal with substantial retention of the information of the signal, the system comprising means for extracting the transient component of the auditory signal, and means for detecting an envelope the transient component.

89 Claims, 37 Drawing Sheets

U.S. PATENT DOCUMENTS

| | | | |
|---|---|---|---|
| 4,817,159 | 3/1989 | Hoshimi et al. | 704/254 |
| 4,821,325 | 4/1989 | Martin et al. | 704/253 |
| 5,035,242 | 7/1991 | Franklin et al. | 607/108 |
| 5,091,948 | 2/1992 | Kametani | 704/248 |
| 5,220,639 | 6/1993 | Lee | 395/2 |
| 5,327,518 | 7/1994 | George et al. | 704/211 |

FOREIGN PATENT DOCUMENTS

| | | |
|---|---|---|
| 143540 | 8/1980 | Germany . |
| 4203436 | 8/1992 | Germany . |
| 4106346 | 9/1992 | Germany . |
| 4106347 | 9/1992 | Germany . |
| 591908 | 2/1978 | U.S.S.R. . |
| 898496 | 1/1982 | U.S.S.R. . |
| 2186160 | 8/1987 | United Kingdom . |
| 2213623 | 8/1989 | United Kingdom . |
| 831526 | 4/1983 | WIPO . |

Speech signal.

Pretransient signal

Transient signal.

METHOD AND SYSTEM FOR DETECTING AND GENERATING TRANSIENT CONDITIONS IN AUDITORY SIGNALS

The present invention relates to a method and system for signal processing, by which method and system features representing distinct sound pictures in auditory signals are extracted from transients in the auditory signals. The result of the processing may be used for identification of sound or speech signals or for quality measurement of audio products or systems, such as loudspeakers, hearing aids, telecommunication systems, or for quality measurement of acoustic conditions. The method of the present invention may also be used in connection with speech compression and decompression in narrow band telecommunication.

In the prior art methods of signal analysing of auditory signals, the signals are considered to be steady state over a short time of period, and a form of short time spectral analysis is used under this assumption.

The human ear has the ability to simultaneously catch fast sound signals, detect sound frequencies with great accuracy and differentiate between sound signals in complicated sound environments. For instance it is possible to understand what a singer is singing in an accompaniment of musical instruments.

In prior art methods of signal analysis and in the method of the present invention it is assumed that the cochlea in the human ear can be regarded as an infinite number of bandpass filters, IBP, within the frequency range of the human ear.

The time response f(t) for one bandpass filter due to an excitation can be separated into two components, the transient response, ft(t), and the steady state response, fs(t), $$f(t)=ft(t)+fs(t). \qquad (1)$$

Traditional signal processing is based on the steady state response fs(t), and the transient response ft(t) is assumed to vanish very fast and to be without importance for the perception, see for example "Principles of Circuit Synthesis", McGraw-Hill 1959, Ernest 5. Kuh and Donald O. Pederson, page 12, lines 9-15, where it is stated that: "only the forced response is considered while the response due to the initial state of the network is ignored".

Thus, when students are introduced to the world of signal analysis, they learn at a very early stage that the transient response, i.e. the response due to the initial state of the network should be ignored because it vanishes within a very short period of time. Furthermore, it is rather difficult to analyse these transient signals by use of traditional linear methods of analysis.

The ability of the human ear to hear very short sounds and at the same time detect frequencies with great accuracy is in conflict with the traditional filterbased spectrum analysis. The time window (twice the rise time) of a bandpass filter is inversely proportional to the bandwidth, $$tw=2/(fu-fl) \qquad (2)$$

where fl is the lower cutoff frequency and fu is the upper cutoff frequency.

Thus, if a rise time of 5 ms is required the consequence is that the frequency resolution is no better than 400 Hz.

As the detection of these transients is in conflict with a high frequency resolution, the detecting by the human ear of these transients must take place in an alternative manner. It has not been examined how the human ear is able to detect these signals, but it might be possible that the cochlea, when no sounds are received, is in a position of rest, where the cochlea will be very broad-banded. When a sound signal is received, the cochlea may start to lock itself to the frequency component or components within the signal. Thus, the cochlea may be broad-banded in its starting position, but if one or more stable frequencies are received the cochlea may lock itself to this frequency or these frequencies with a high accuracy.

Today it is known that the nerve pulses launched from the cochlea are synchronized to the frequency of a tone if the frequency is less than about 1.4 kHz. If the frequency is higher than 1.4 kHz the pulses are launched randomly and less than once per cycle of the frequency.

Signal analysis based on filter bank spectrum analysis is disclosed in GB 2213623 which describes a system for phoneme recognition. This system comprises detecting means for detecting transient parts of a voice signal, where the principal object of the transient detection is the detection of a point where the speech spectrum varies most sharply, namely, a peak point. The detection of the peak points is used for a more precise phoneme segmentation. The transient analysis of GB 2213623 is based on a spectrum analysis and the change in the spectrum, which is very much different to the transient analysis of the present invention which is based on a direct transient detection in the time domain.

The present invention is based on an approach which is different in principle from all known methods for analysing auditory signals. According to the invention it has been found that the signal information relevant to the identification of the auditory signal is present in the transient component of the signal. Thus, the method of the present invention involves a separation of the transient component or response of the auditory signal, a generation of a transient pulse corresponding to the transient component, and analysis of the shape of the pulse. In an auditory signal, the corresponding transient pulse may be repeated with time intervals, and the time interval of these periodic transient pulses is normally also analysed or determined.

In real life the human ear reacts to energy changes at high frequencies in order to recognize phonemes or sound pictures. But in the present method transient pulses corresponding to the energy changes observed by the ear are extracted at these high frequencies, whereafter the transient pulses preferably are transformed to the low frequency range still maintaining the distinct features of the sound pictures or phonemes. Thus, by using the principles of the invention, it is possible to obtain distinct features within auditory signals by examining the transformed low frequency signals.

As will be understood from the following explanation of the method of the invention, the concept of extracting transient waveforms or shape of pulses makes it possible to use pre-process methods which are much simpler than the best designs presently used and at the same time obtain much more valuable information with respect to the auditory input signals.

In its broadest aspect, the invention relates to the use of the shape of energy changes of an auditory signal for identifying or representing features which can be perceived by an animal ear such as a human ear as representing a distinct sound picture.

Before entering into a more detailed explanation of features of the method of the invention, a few definitions will be given:

In short time analysis the transient component in a signal is a matter of definition. The idea is to obtain an expression that gives a response corresponding to the response in the cochlea to an abrupt change in the signal energy. An abrupt change in the signal energy corresponds to the transient component in the auditory signal. Thus, in the present context, the term "transient component" designates any signal corresponding to an abrupt energy change in an auditory signal. The transient component holds the signal information to be analysed and in order to analyse this information the transient component may be transformed to a corresponding transient pulse having a distinct shape. Thus, in the present context, the term "transient pulse" refers to a pulse having a distinct shape and substantially holding the information of the transient component of the auditory signal and thus corresponding to an abrupt change in the energy of the auditory signal. As mentioned above the transient part of a sound signal may be repeated with time intervals and thus, in the present context, the term "periodic" when used in combination with a transient component, response or pulse designates any transient component, response or pulse being repeated with intervals.

The term "shape" designates any arbitrary time-varying function (which is time-limited or not time-limited) and which, within a given time interval Tp has a distinctly different amplitude level in comparison with the amplitude level outside the interval. Thus, Tp is the duration of the shape function when the shape function is time-limited, or the duration of the part of the function which has a distinctly different amplitude level in comparison with the amplitude level outside the time interval. As will be understood, the identification of the shape of a pulse is suitably performed by observing the amplitude of the pulse along the time axis of the pulse.

In order to extract information from the shape of the energy changes, one broad aspect of the invention relates to represent the shape of the energy changes by the shape of a transient pulse of the signal. However, several methods can be applied in order to obtain a transient pulse corresponding to the change in energy, but is is preferred that an envelope detection is being used, where the envelope preferably should be detected from a transient response of the energy change in the auditory signal.

The energy change representing the distinct sound picture can be a phoneme or vowel or any other sound which gives a sudden energy change in an auditory signal.

It is also an aspect of the invention to provide a method for identifying, in an auditory signal, energy changes which can be perceived by an animal ear such as a human ear as representing a distinct sound picture, the method comprising comparing the shape of energy changes of the signal with predetermined energy change shapes representing distinct sound pictures. For the identification it is preferred that the shape of the energy changes are represented by the shape of a transient pulse of the signal, and it is furthermore preferred that the shape of the transient pulse should be obtained by an envelope detection of a transient response of the energy change in the auditory signal.

The invention also relates to a method for processing an auditory signal so as to reduce the bandwith of the signal with substantial retention of the information of the signal, comprising extracting the transient component of the auditory signal and detecting an envelope of the transient component. It is preferred that transient pulse shapes of the signal which can be perceived by an animal ear such as a human ear as representing a distinct sound picture are identified.

It should be noted that the pulse rise time or the form of the leading edge, the duration of the pulse, and the fall time or the form of the lagging edge are all important features for identification of the pulse. In a preferred embodiment of the invention the shape of the leading edge of a pulse is identified, and it is also preferred that the shape of the leading edge is determined by determining rise time, slope and/or slope variation of at least part of the leading edge.

In a preferred embodiment of the invention, the rise time, slope and/or slope variation of at least the top part of the leading edge is determined, since the upper part of the pulse should contain the necessary information. The top part may be defined as the part beginning substantially at a point where the slope is maximum. The top part may also be the part corresponding to the upper 50% of the amplitude of the pulse.

When determining the shape of the pulse several metods may be used, but in a preferred embodiment the rise time, slope and/or slope variation of the leading edge is determined on the basis of at least 5 samples. However any other suitable number of samples may be used. Another preferred method of identification of the shape of the leading edge may be performed using comparison with a library of references. Here, the references with which comparison is made could be selected on the basis of the rise time of the leading edge.

It is also preferred to perform an identification of the duration of the pulse, where the duration of a pulse can be determined as the distance from the leading edge to the lagging edge at a predetermined amplitude.

As should be understood, it is also preferred to identify the shape of the lagging edge of the transient pulse.

The method of the present invention provides an expression for the transient conditions of the auditory signal. The method comprises a bandpass filtration of an auditory signal within the frequency range of the human ear and a detection of a lowpass filtered envelope, which envelope then can be analysed with known methods of signal analysis. The envelope is an expression of the transient part of the signal.

The known method of signal analysis, which should be used when analysing the envelope, and the characteristics of the bandpass filter, which should be selected, will depend on the purpose of the analysis. The purpose may be speech recognition, quality-measurement of audio products or acoustic conditions, and narrow band telecommunication.

The invention also relates to a system for processing an auditory signal to reduce the bandwith of the signal with substantial retention of the information of the signal, comprising means for extracting the transient component of the auditory signal, and means for detecting an envelope of the transient component.

Embodiments and details of the system appear from the claims and the detailed discussion of embodiments of the system given in connection with the figures and a mathematical description of an embodiment of the system.

The invention will now be described in further detail in connection with a mathematical description of the principle of the invention and in connection with the drawing.

Figure 2:
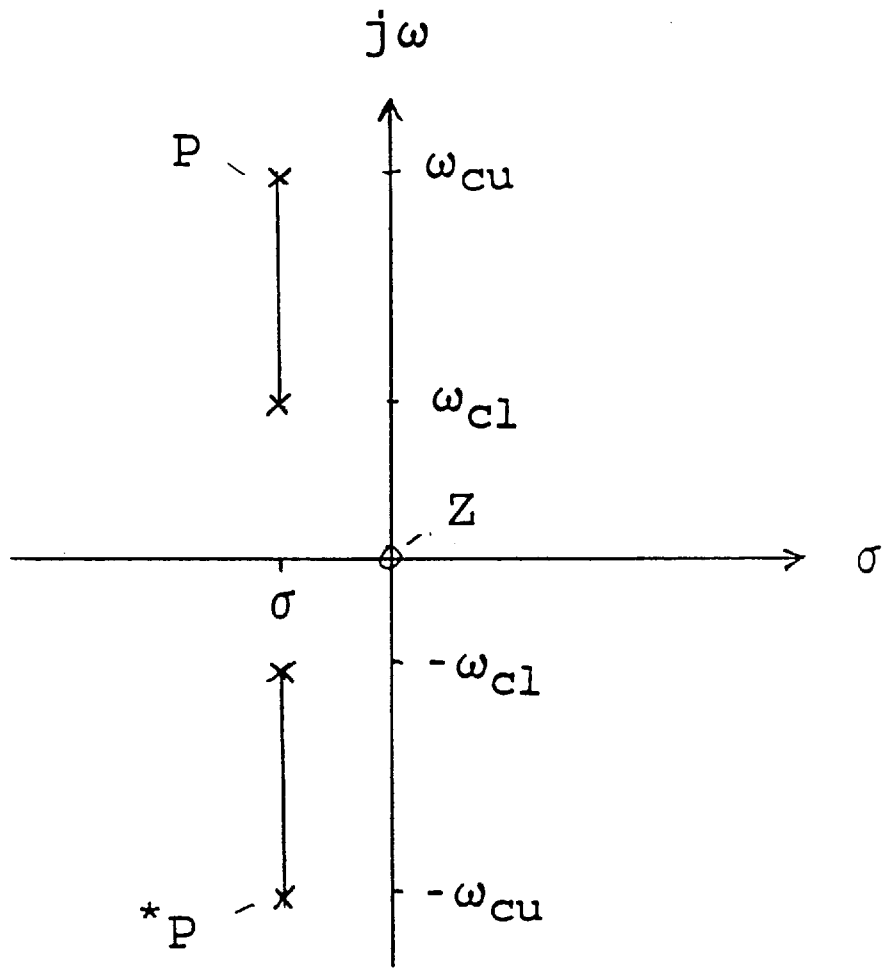
Figure 3:
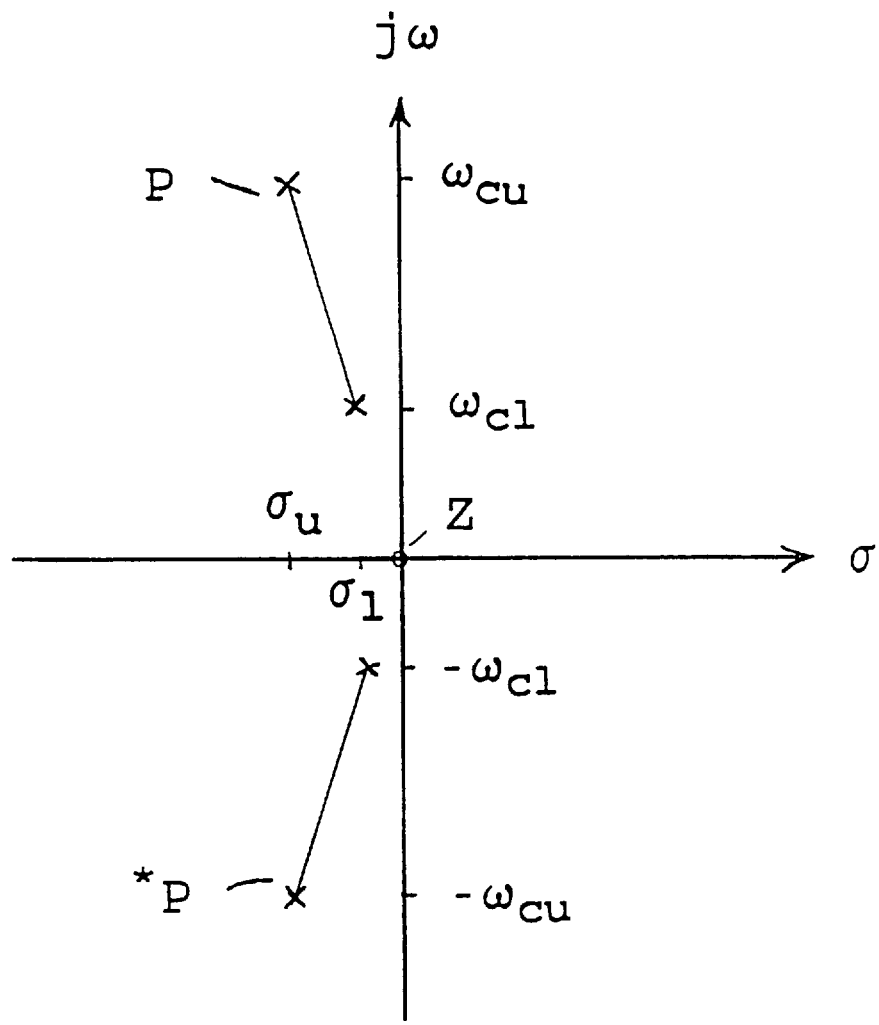
Figure 4:
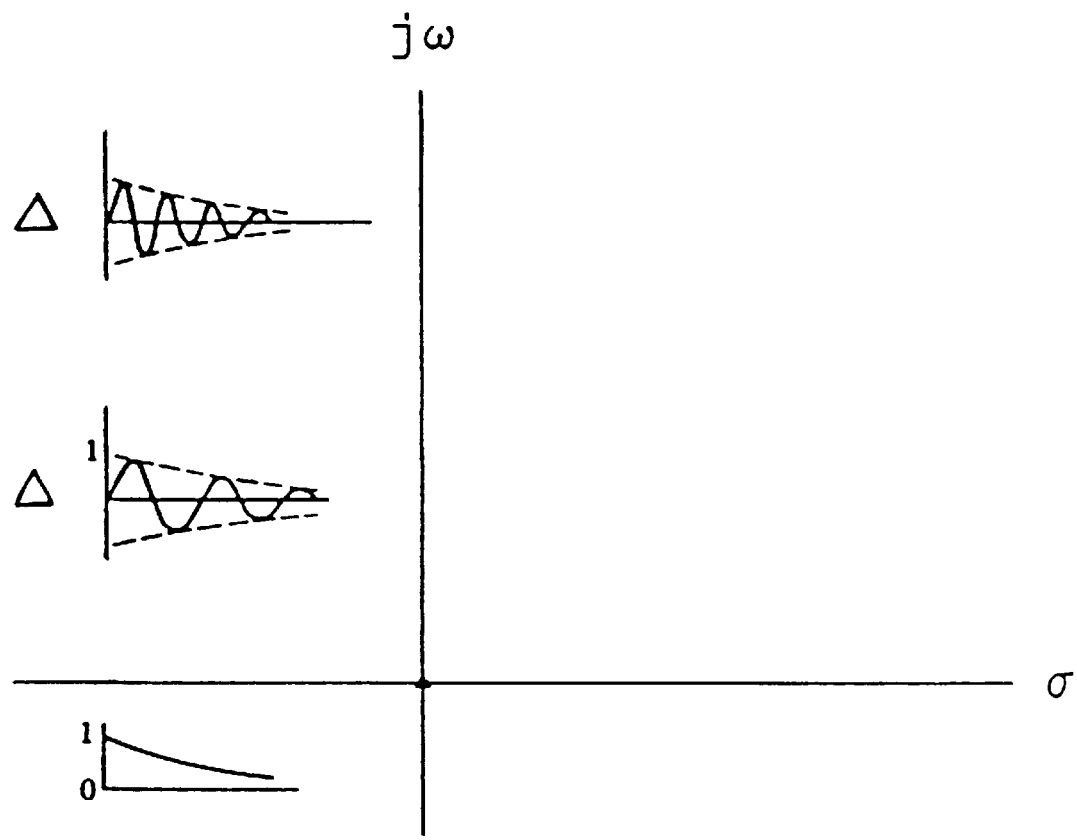
Figure 5:
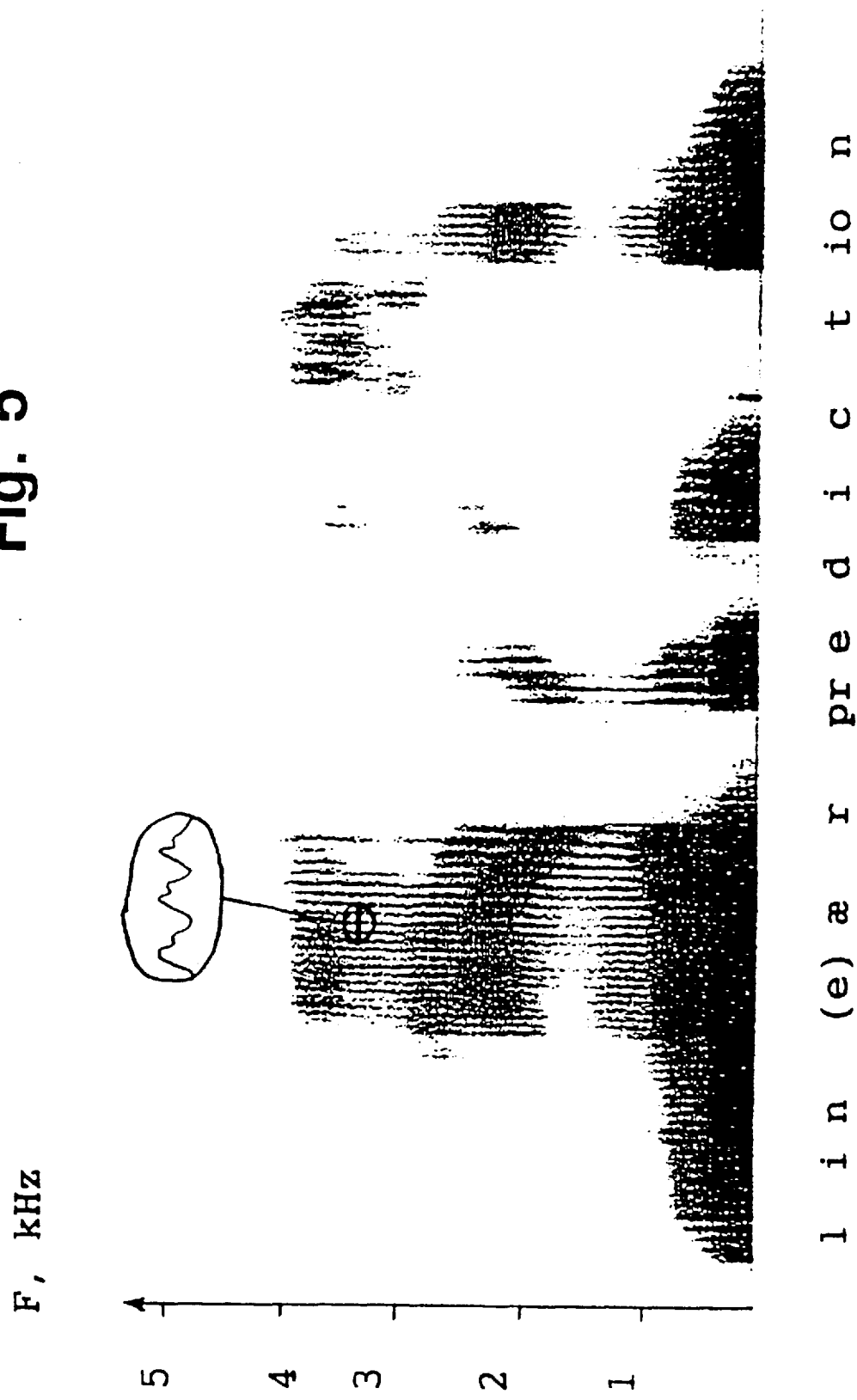
Figure 6:
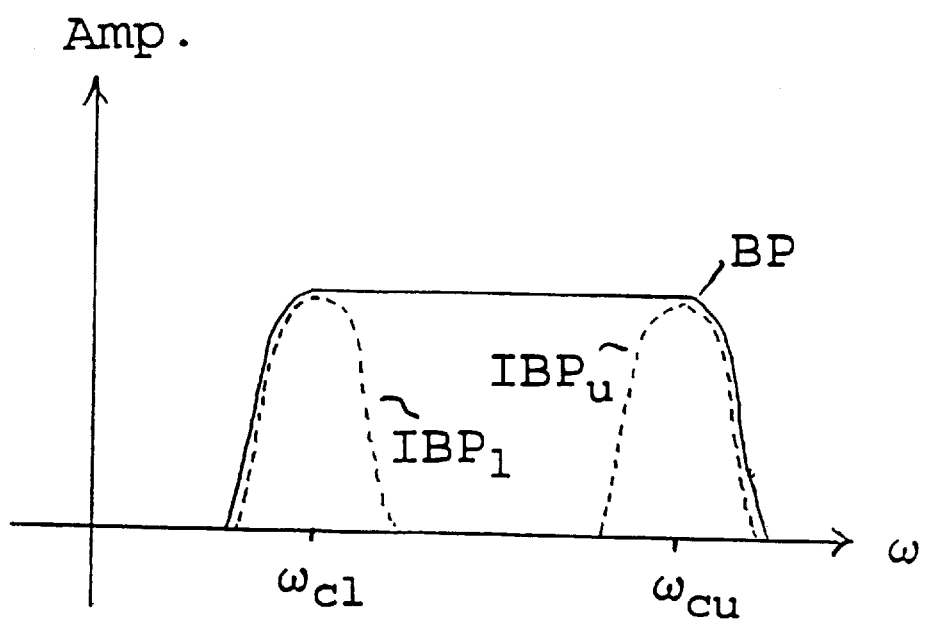
Figure 7:
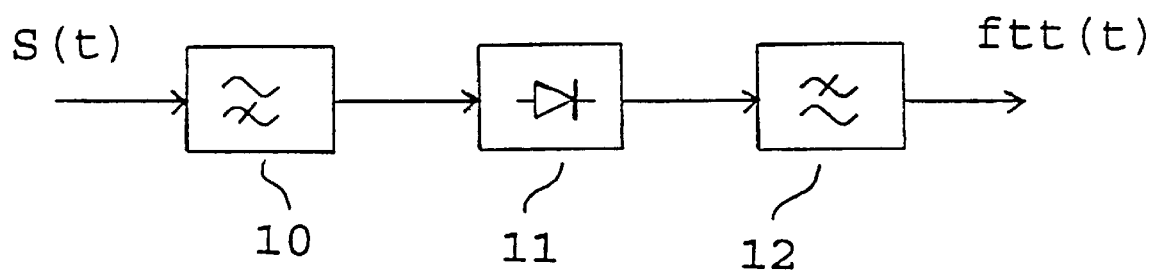
Figure 8:
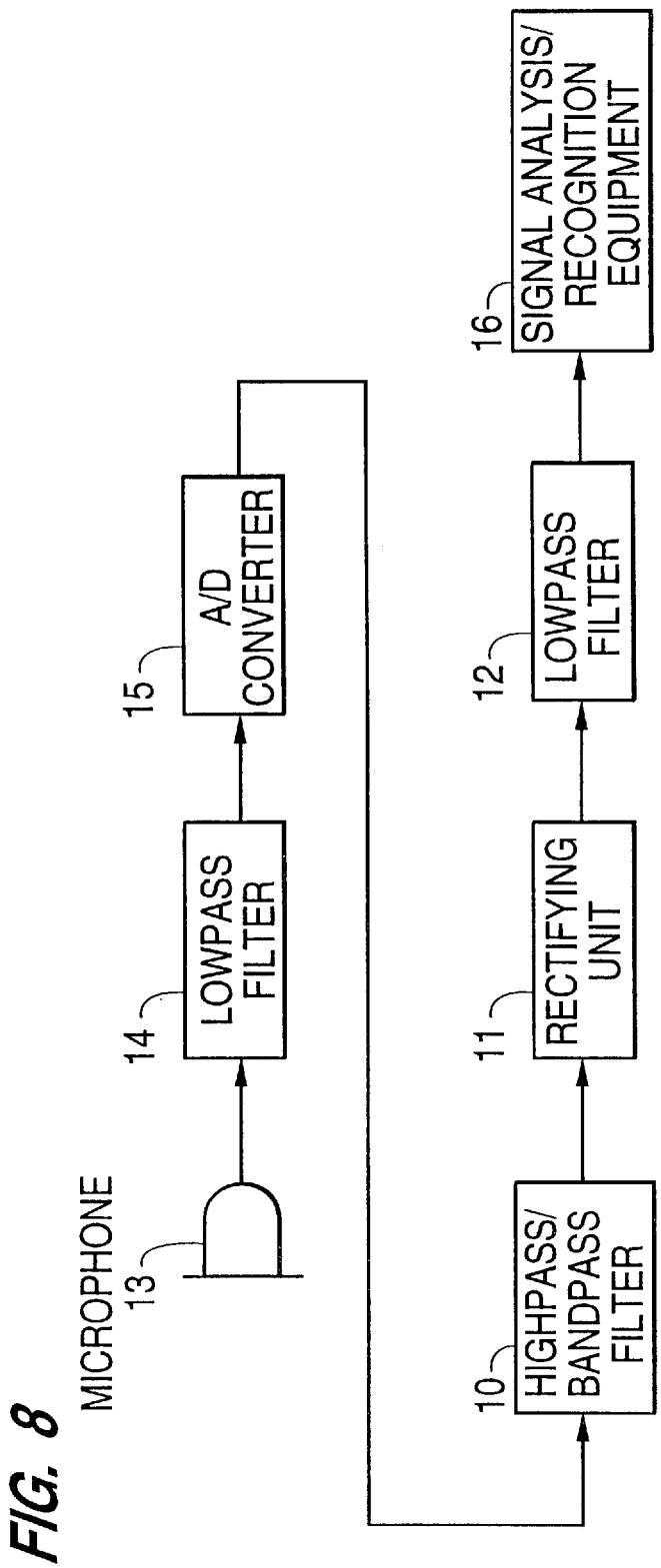
Figure 9:
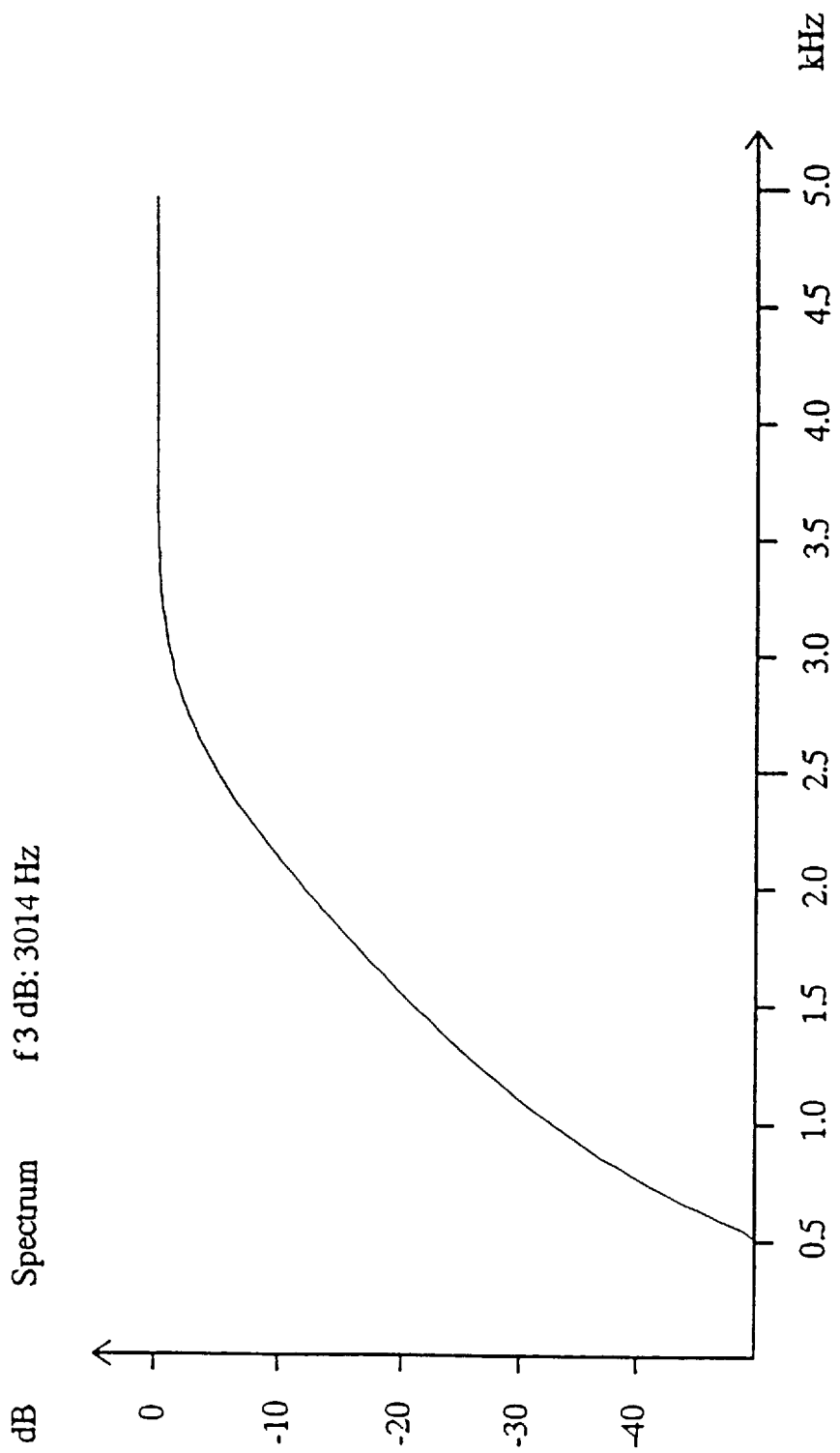
Figure 10:
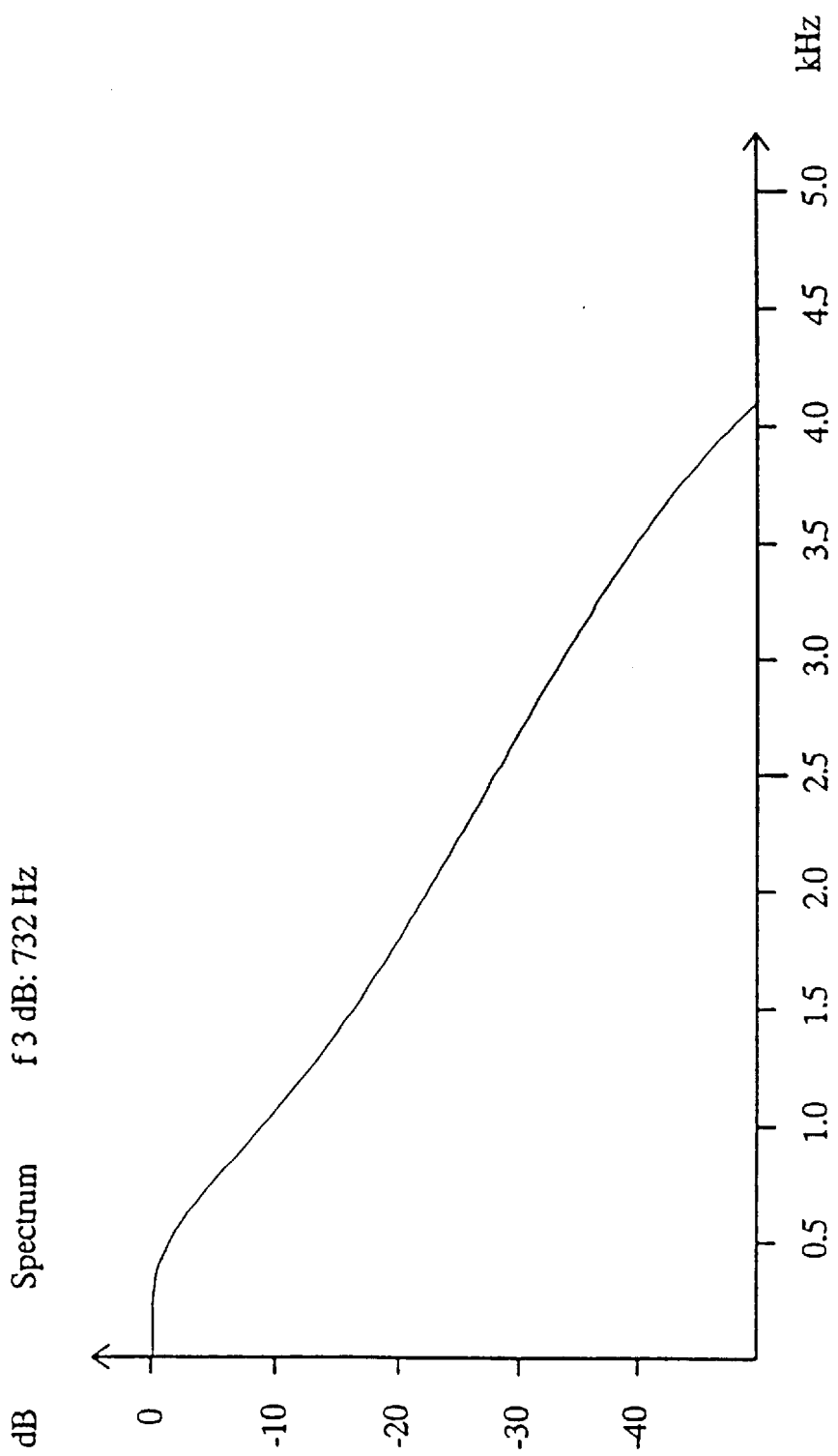
Figure 11:
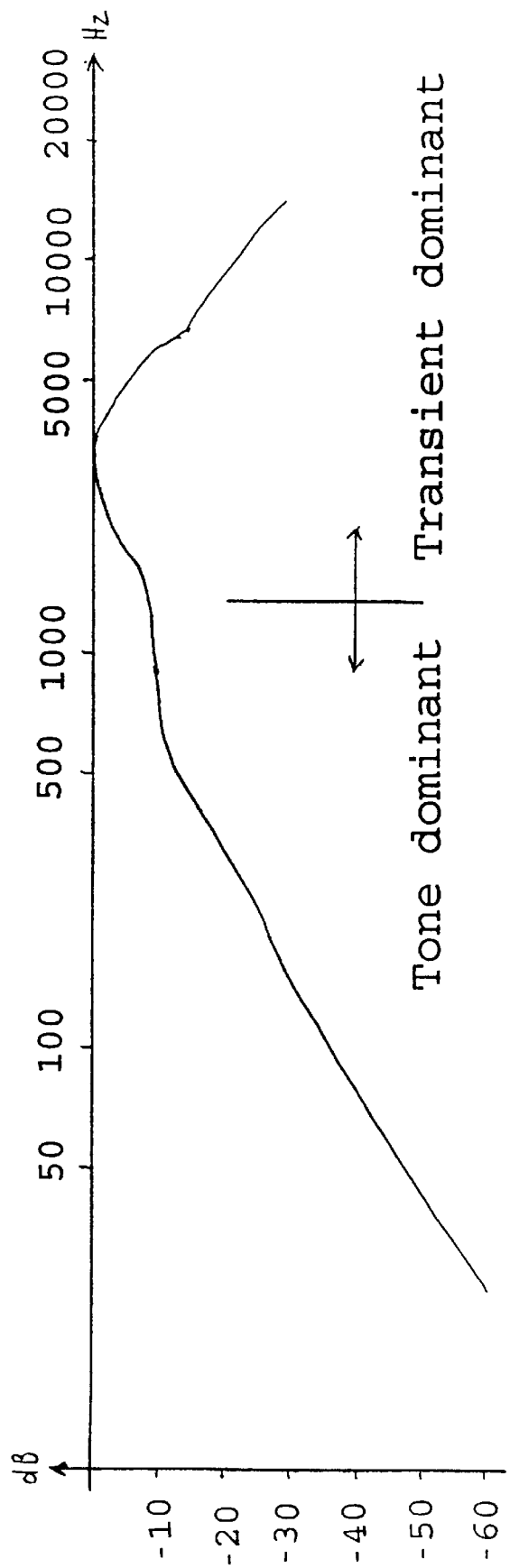
Figure 12:
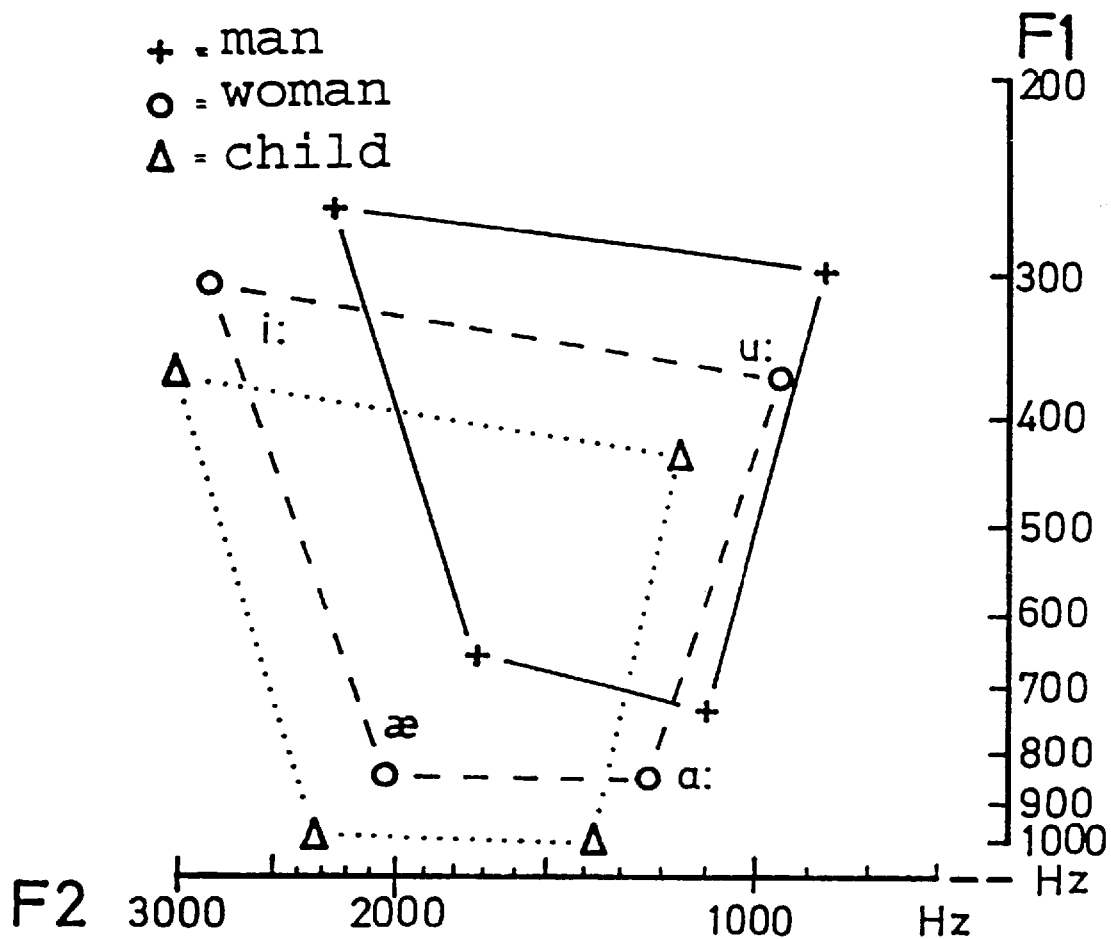
Figure 13A:
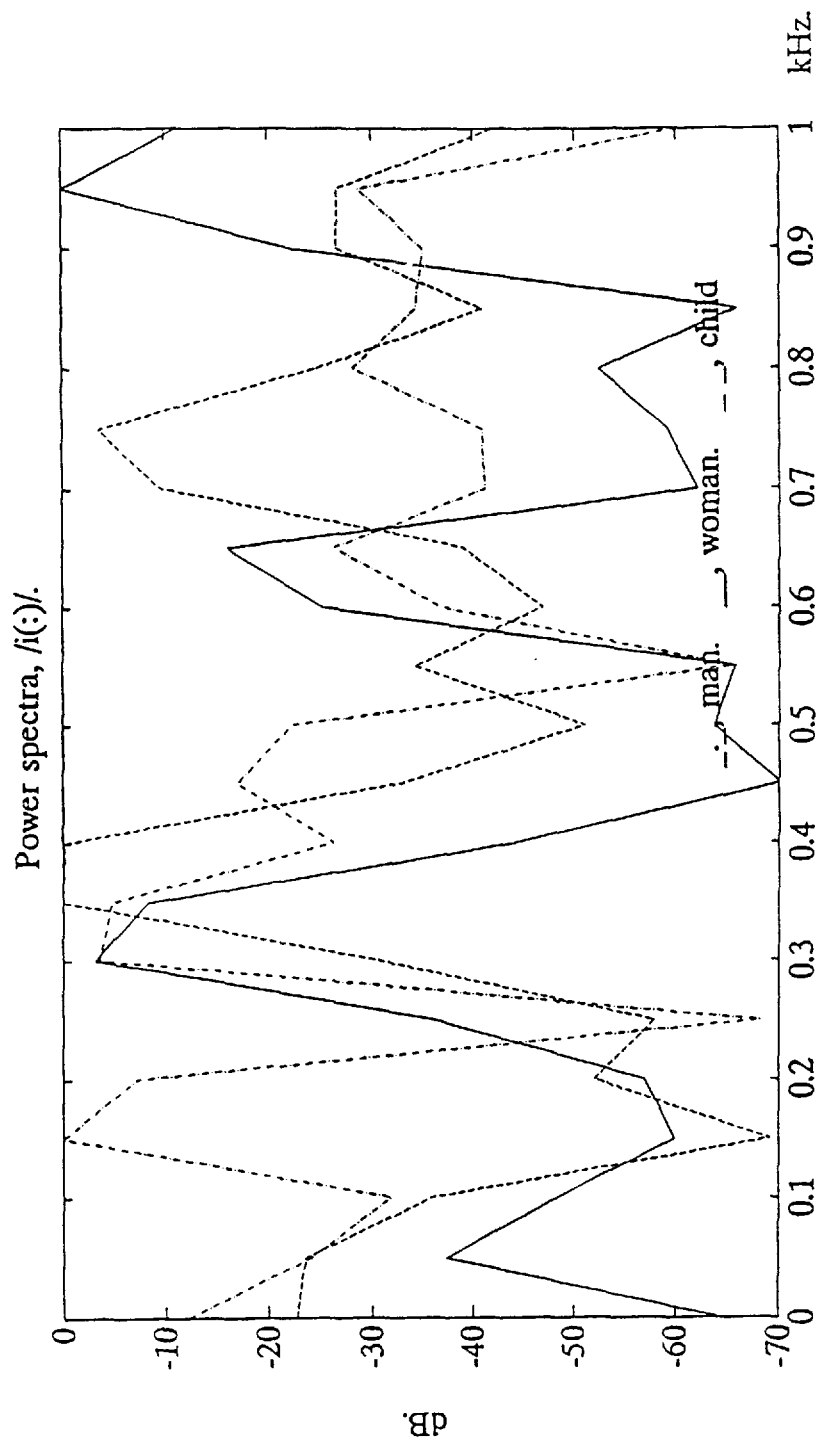
Figure 13B:
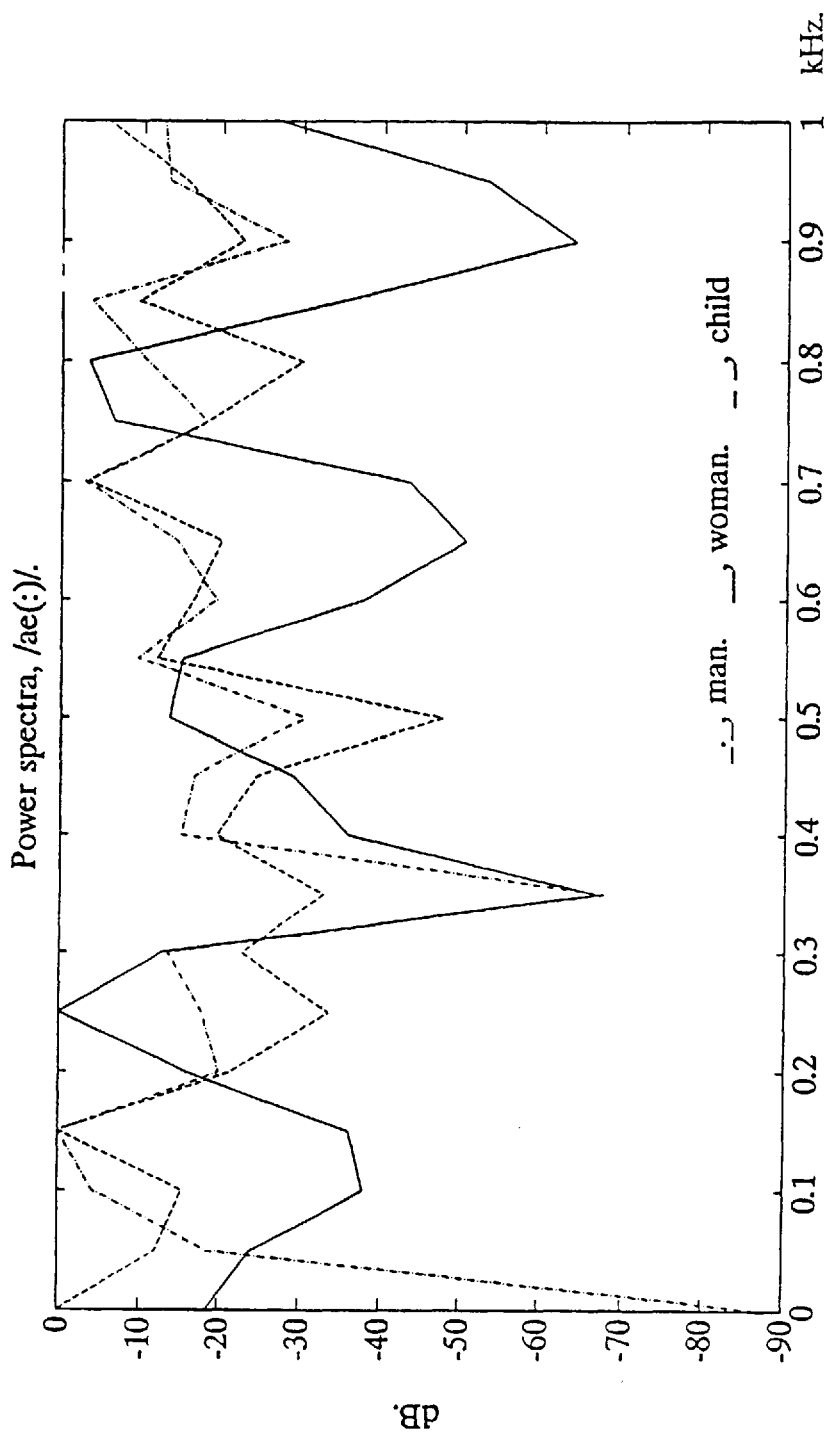
Figure 13C:
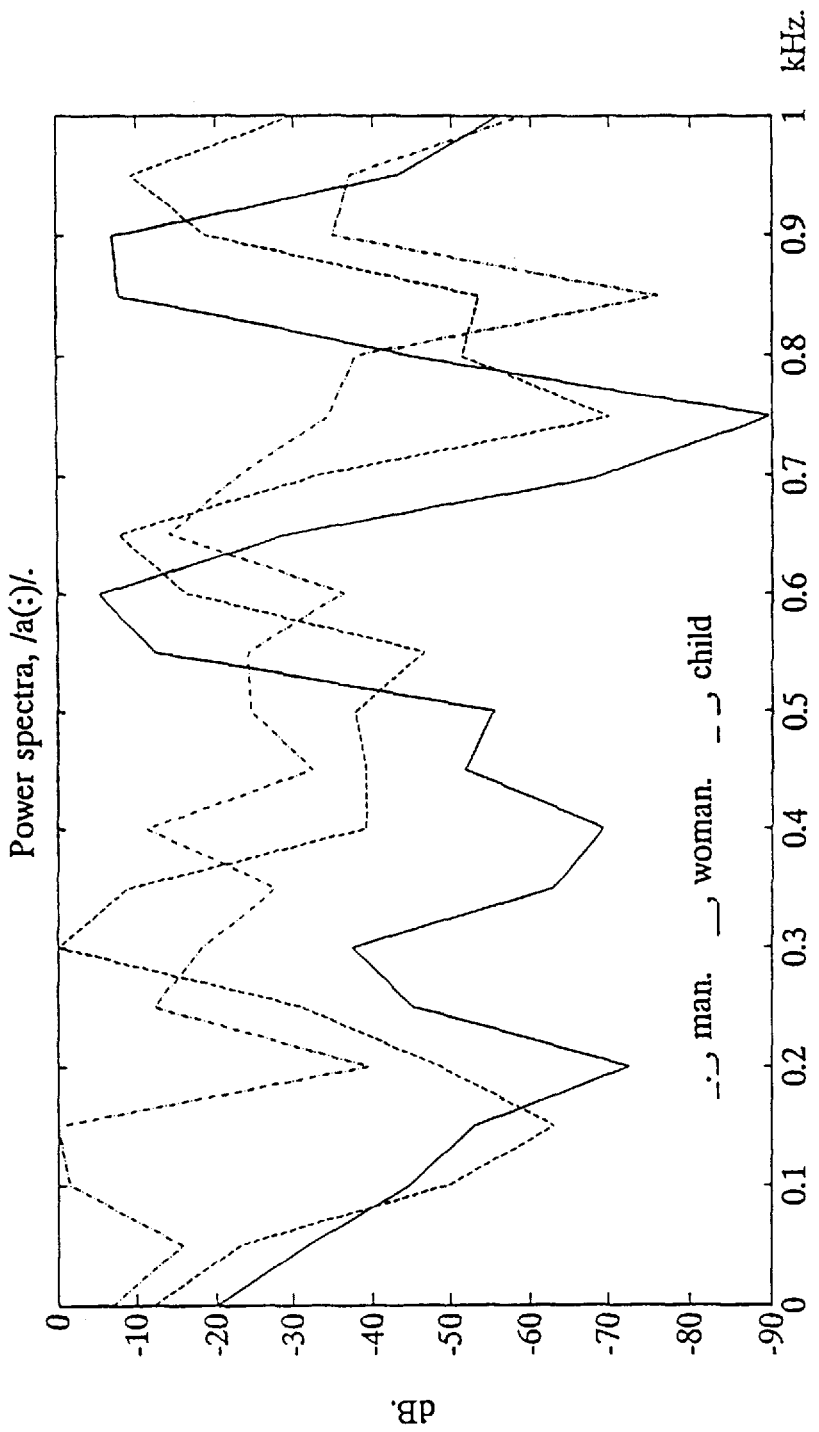
Figure 13D:
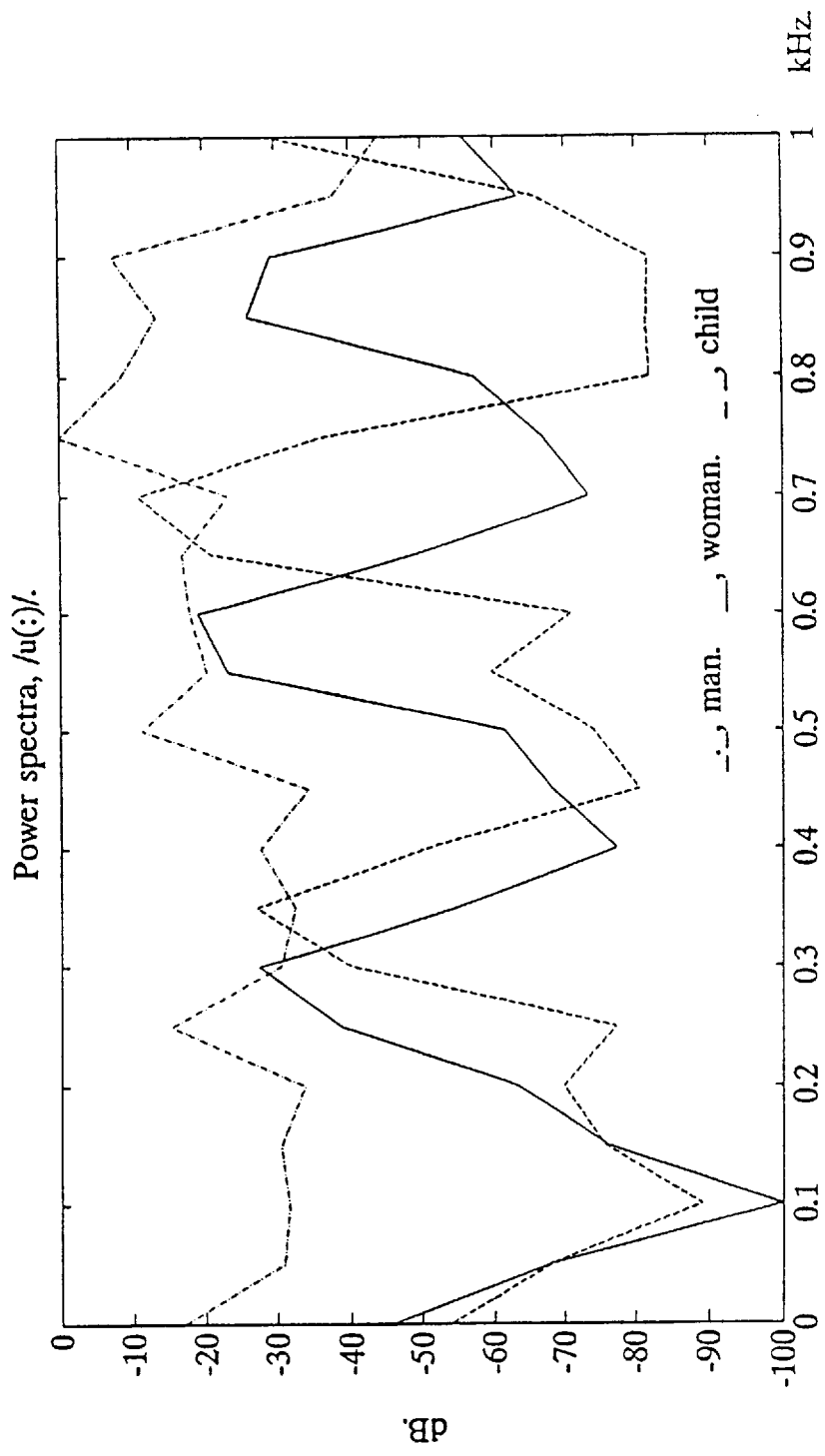
Figure 13E:
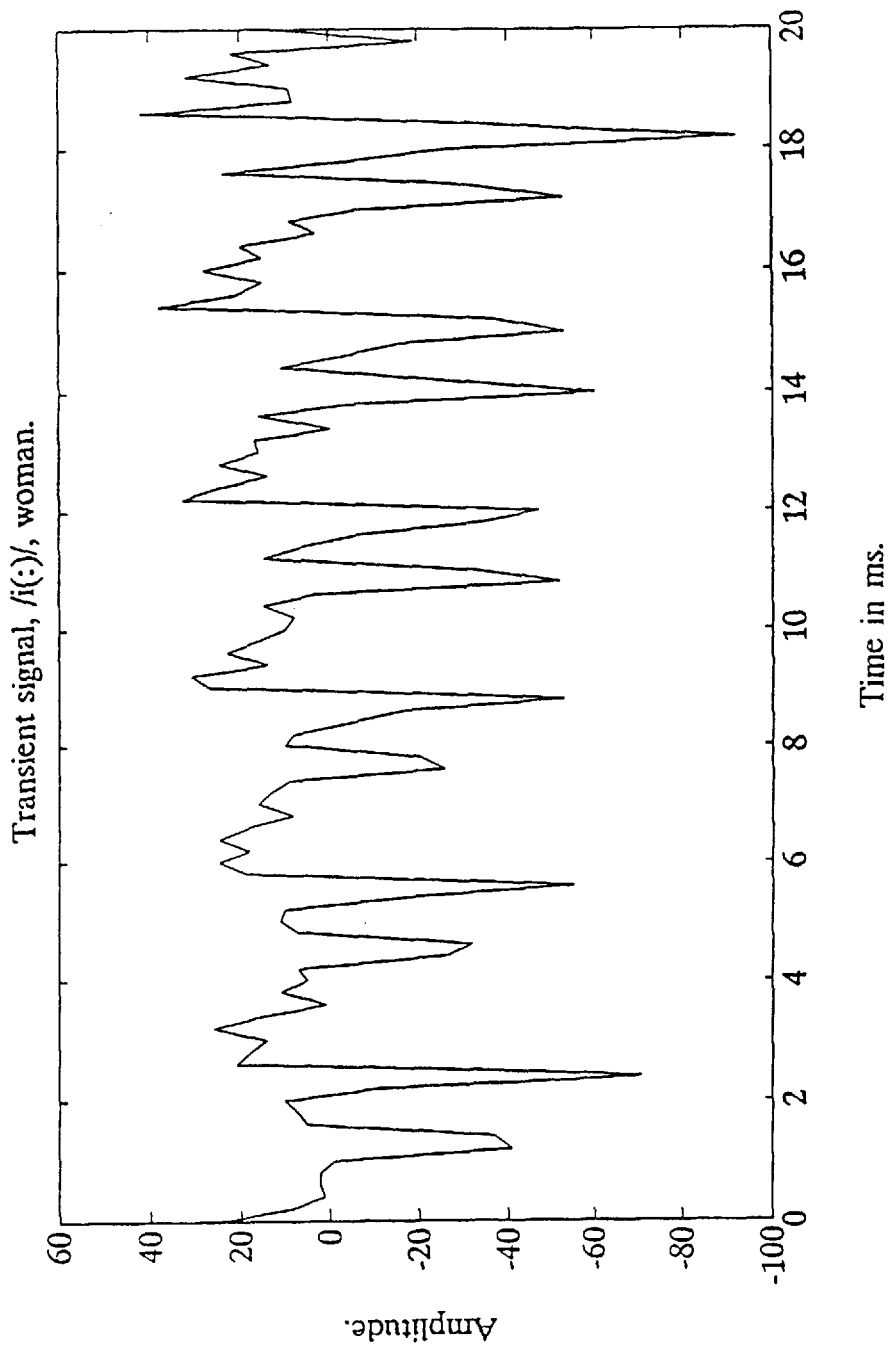
Figure 13F:
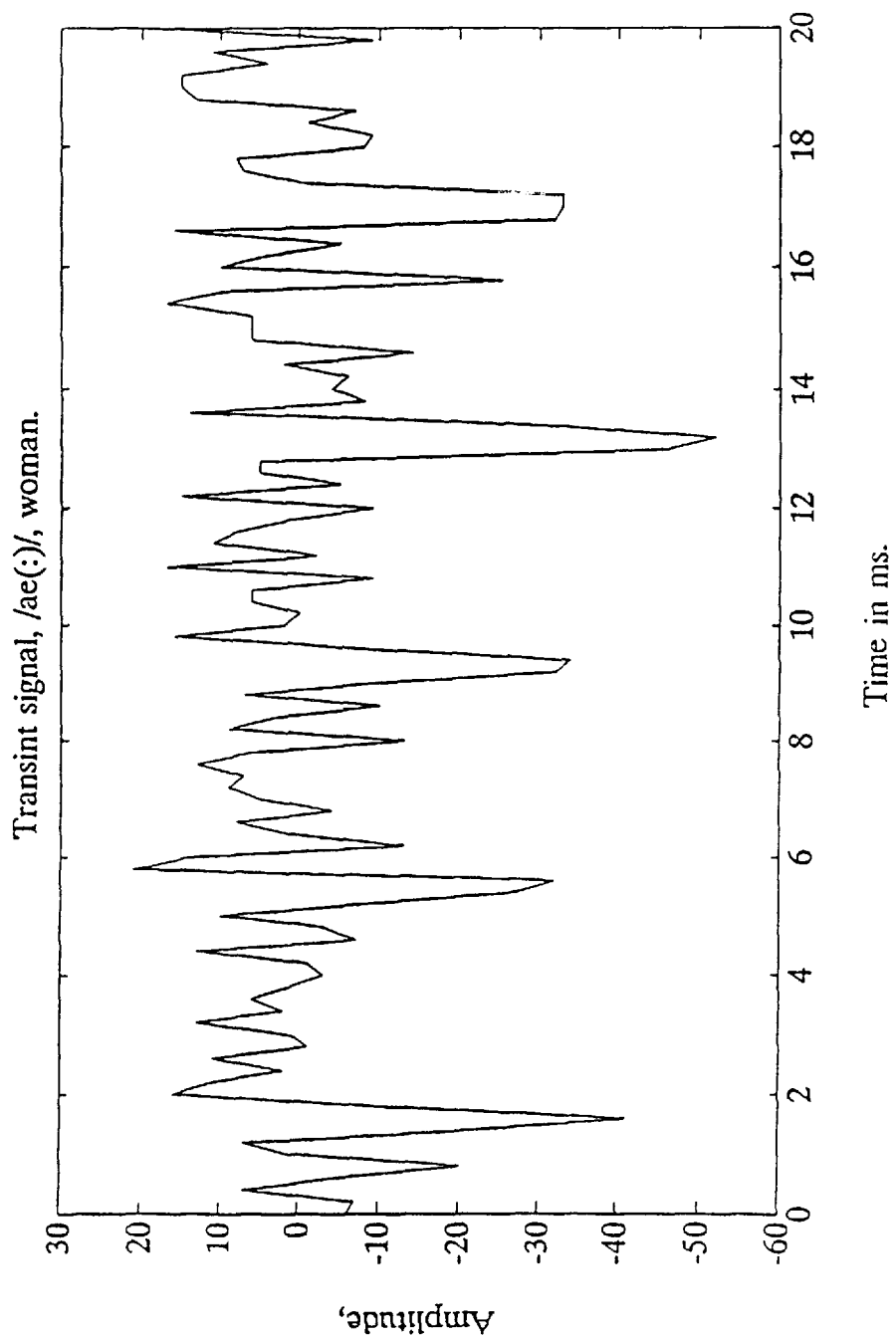
Figure 13G:
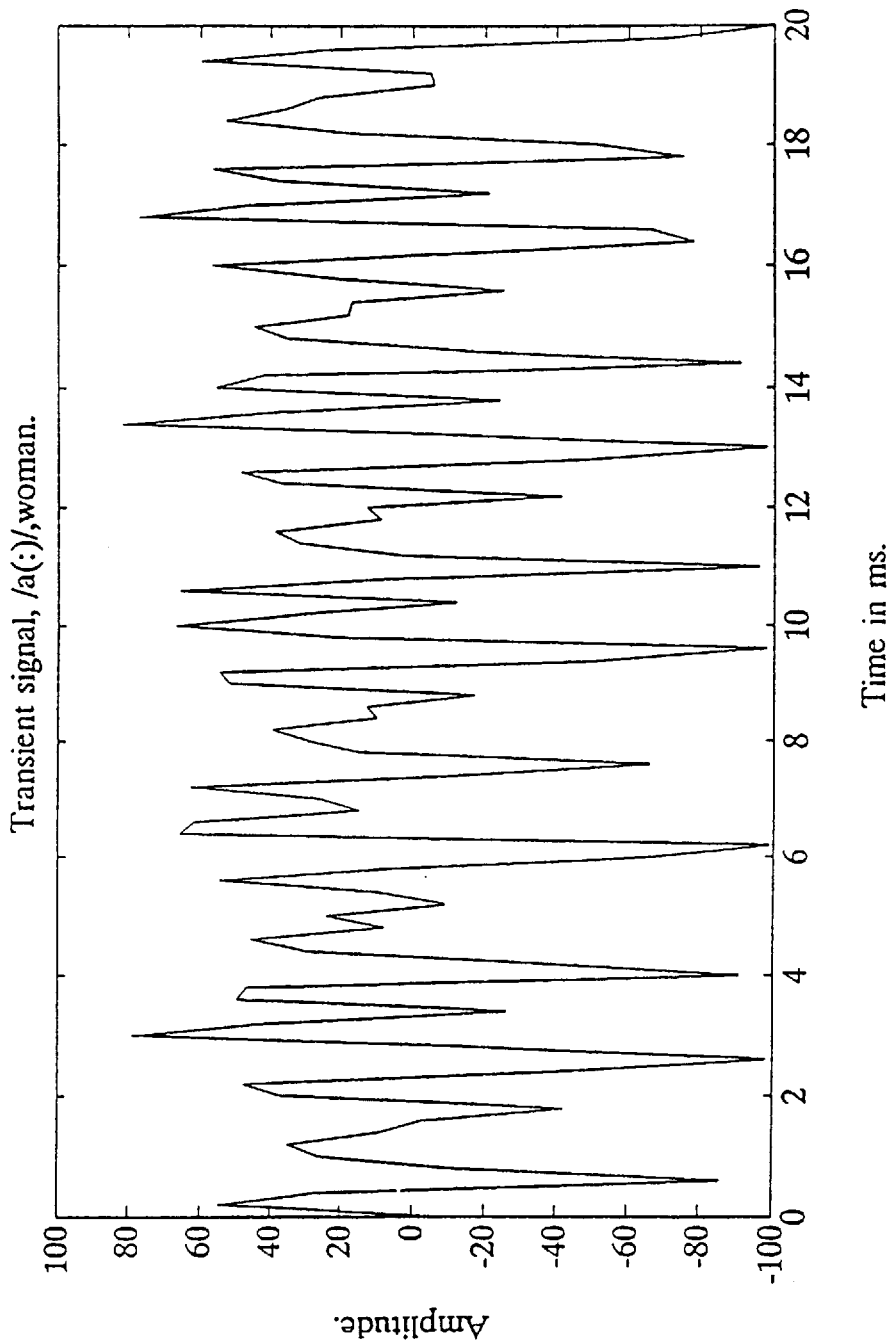
Figure 13H:
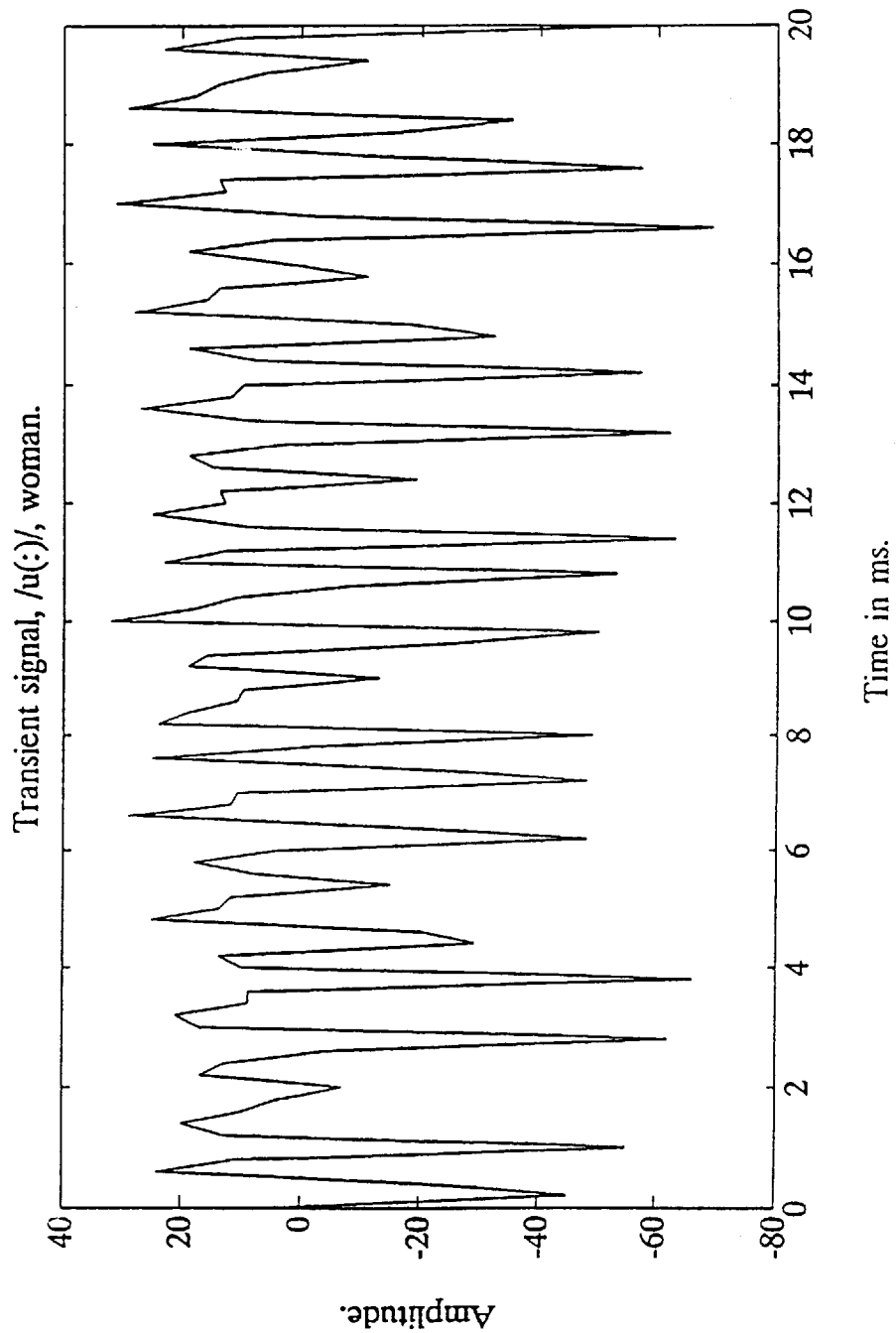
Figure 13I:
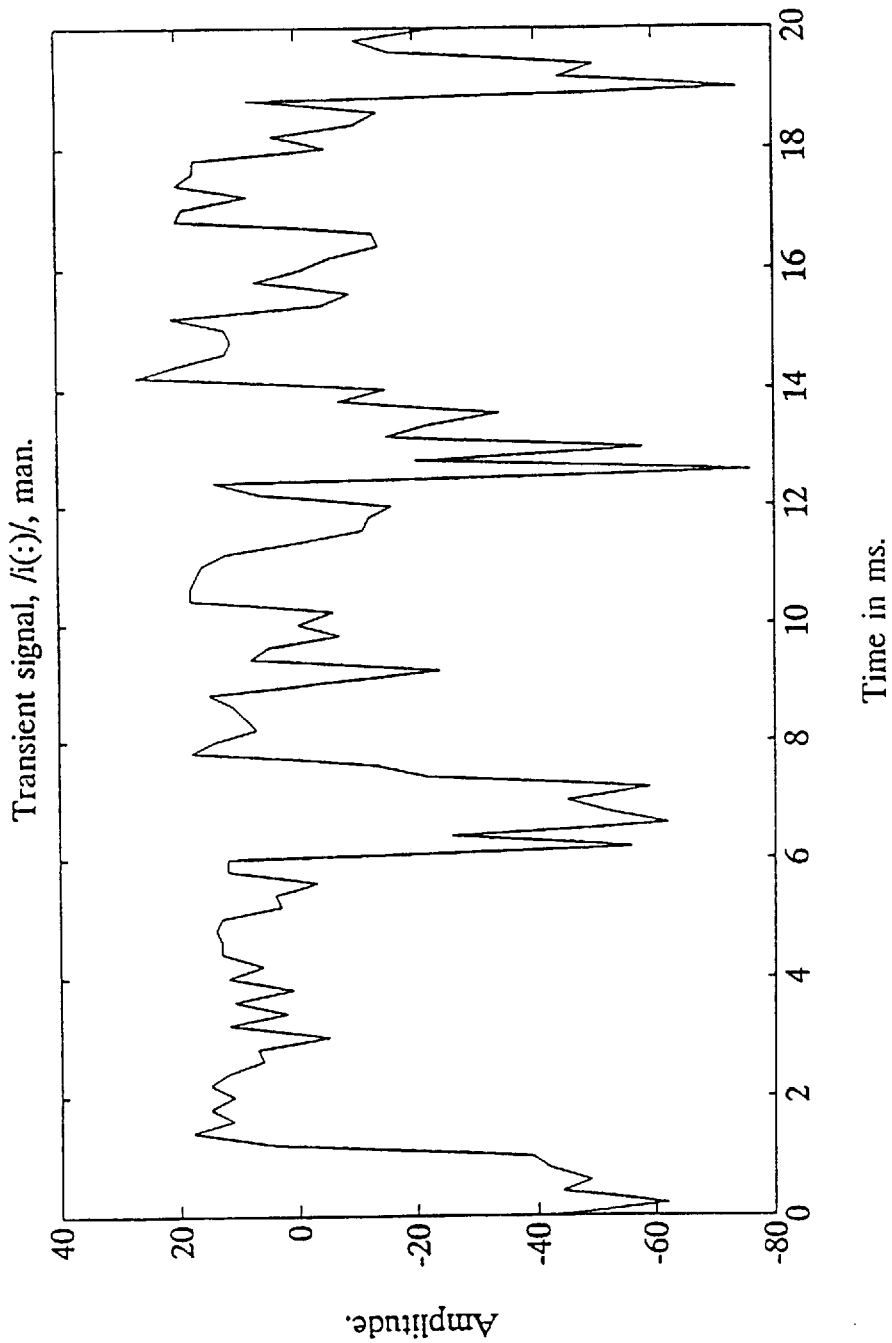
Figure 13J:
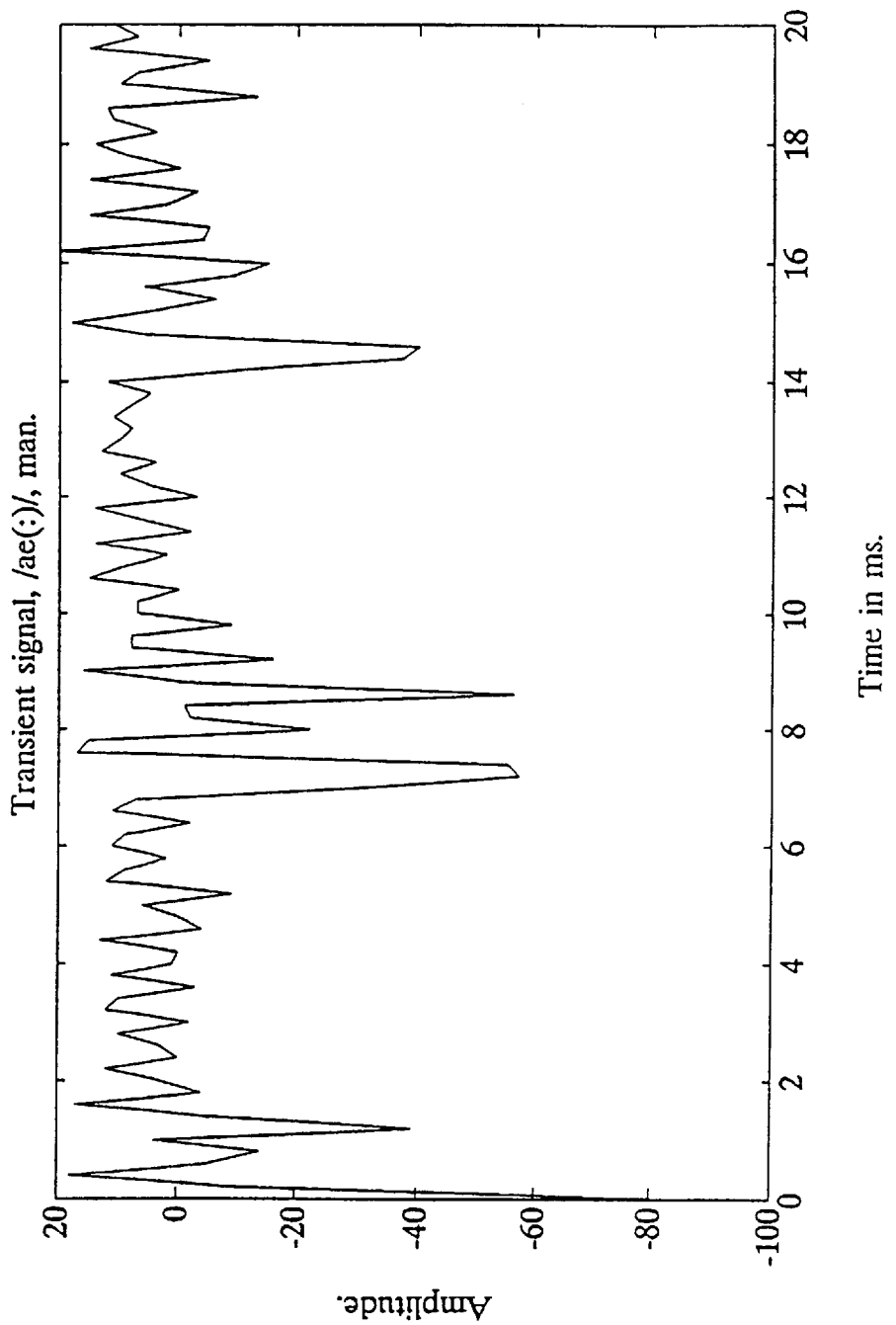
Figure 13K:
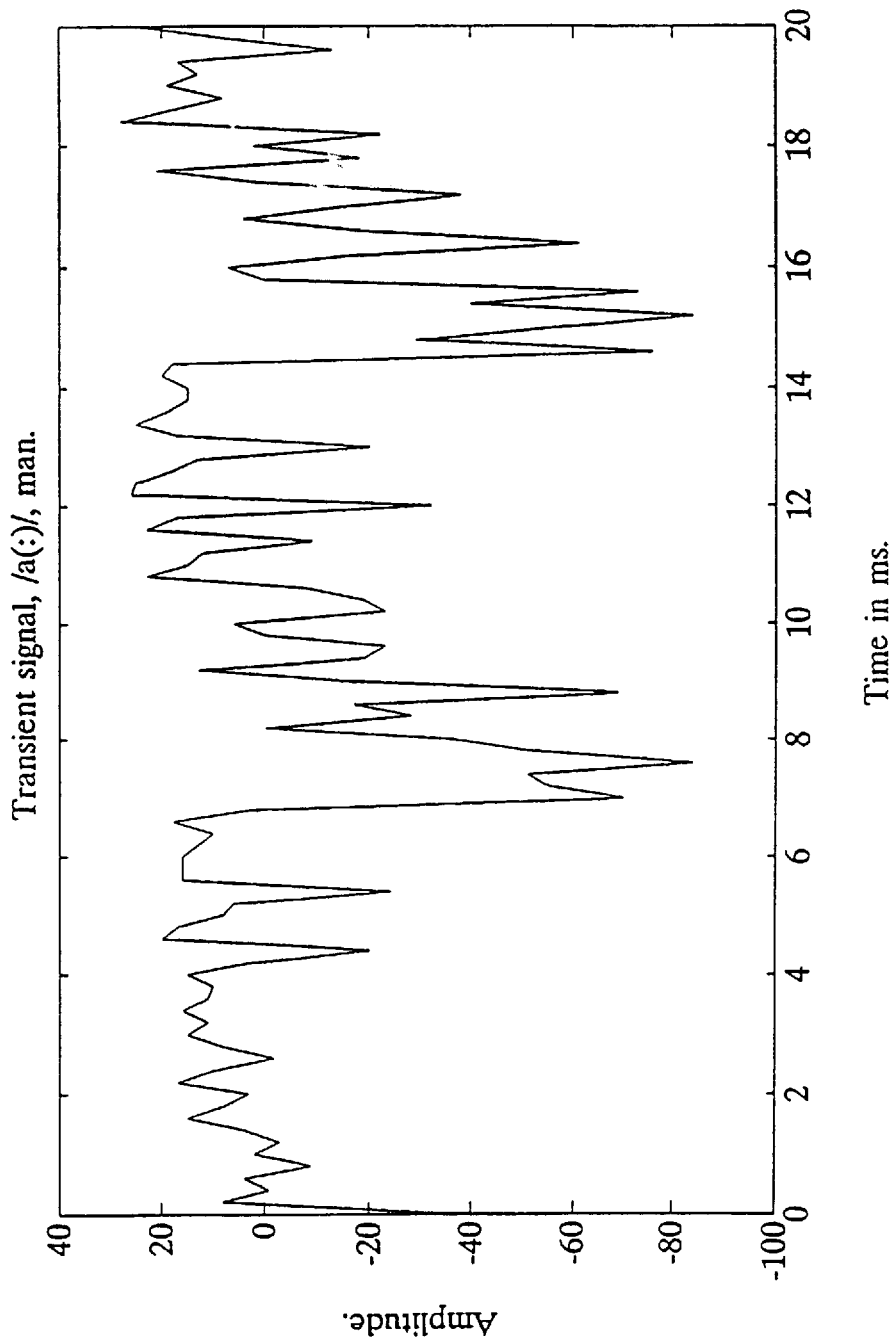
Figure 13L:
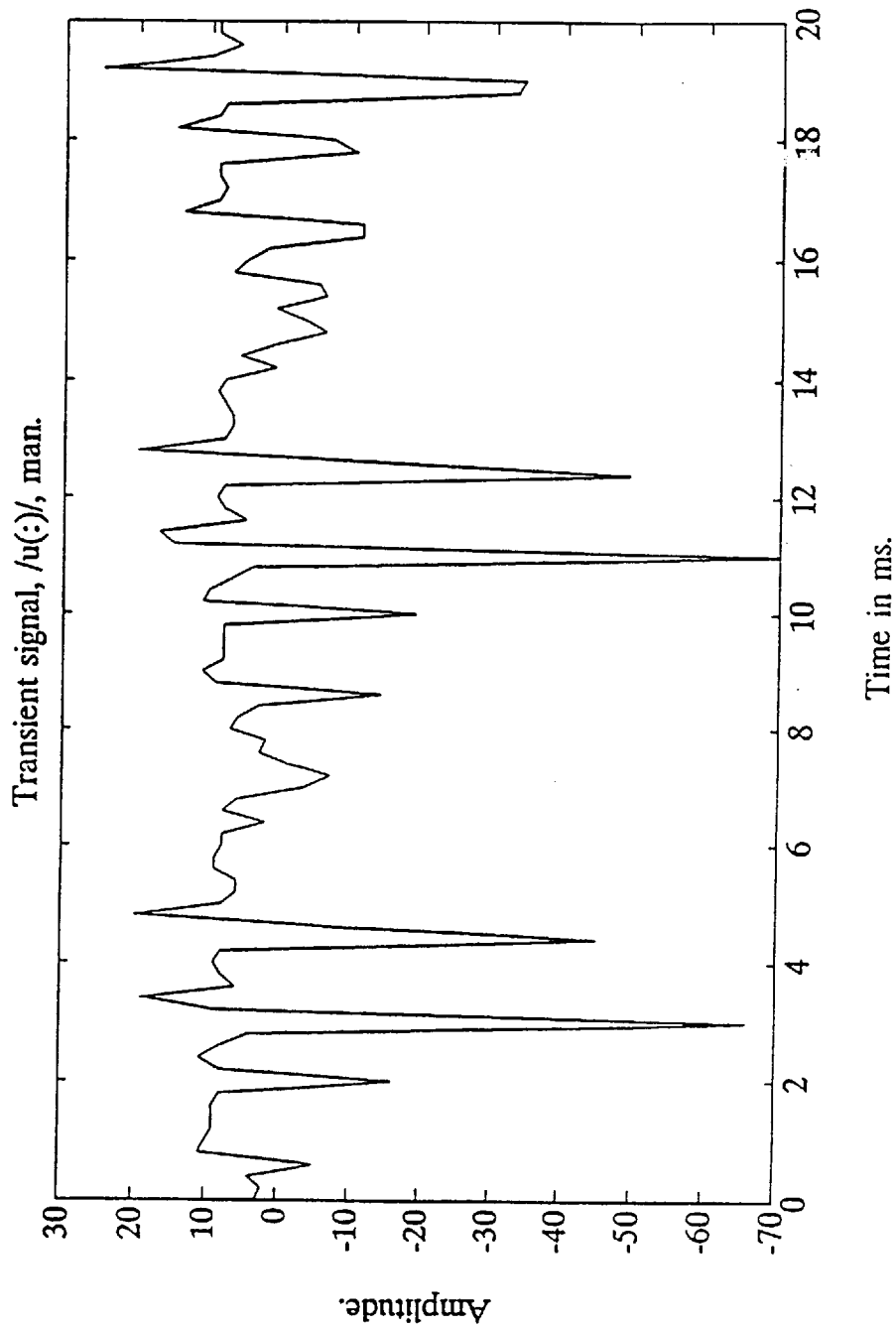
Figure 13M:
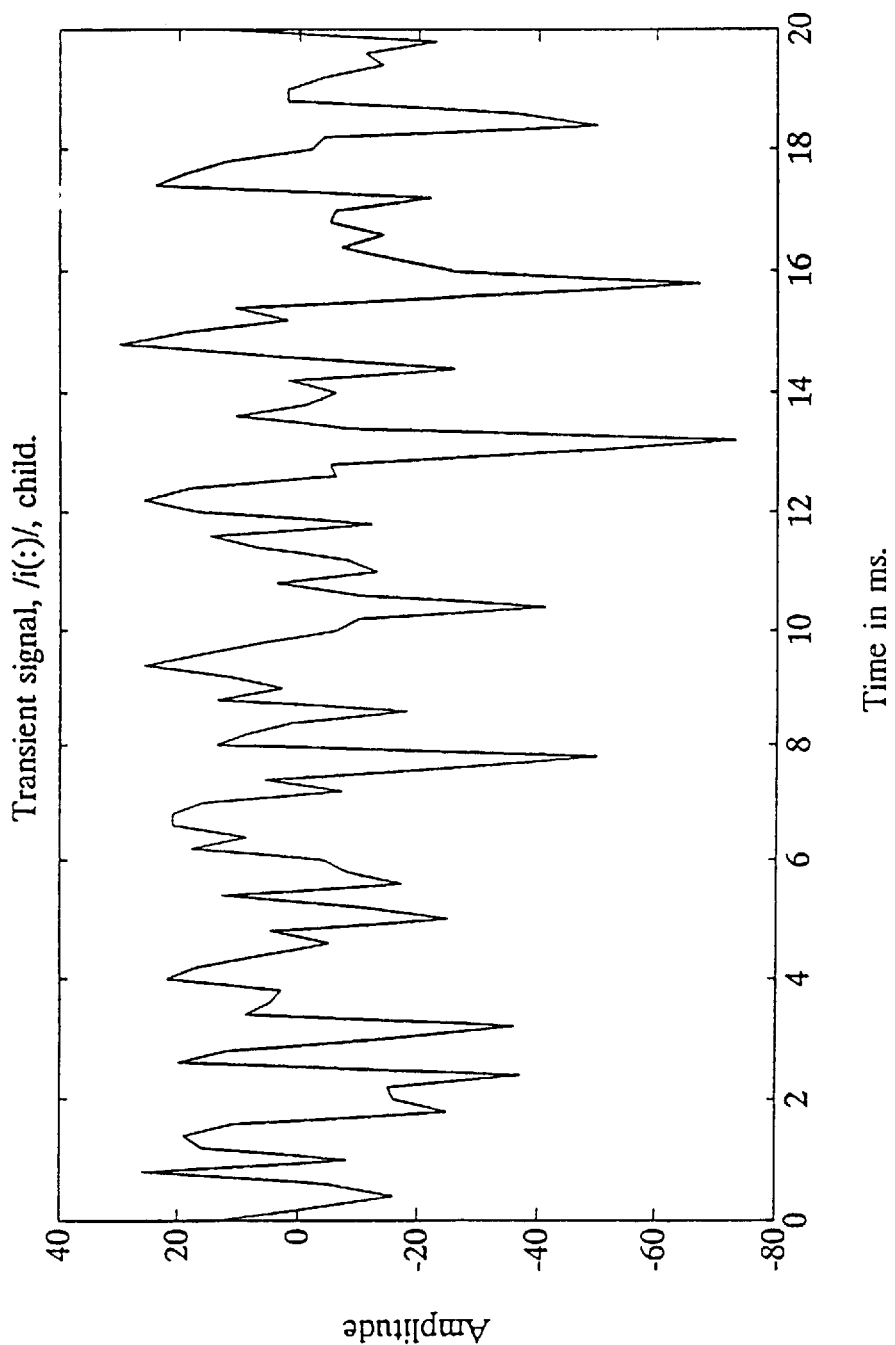
Figure 13N:
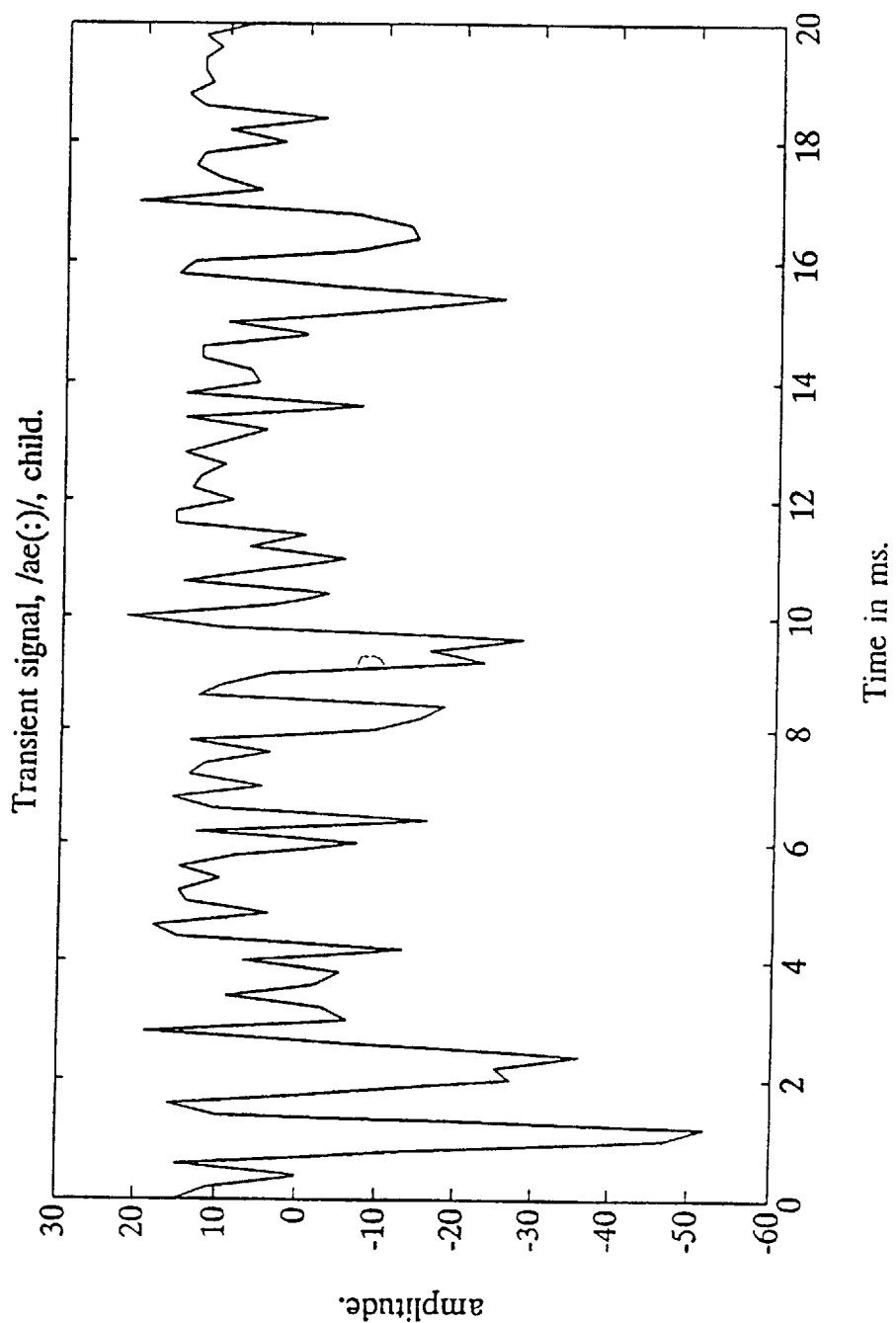
Figure 13O:
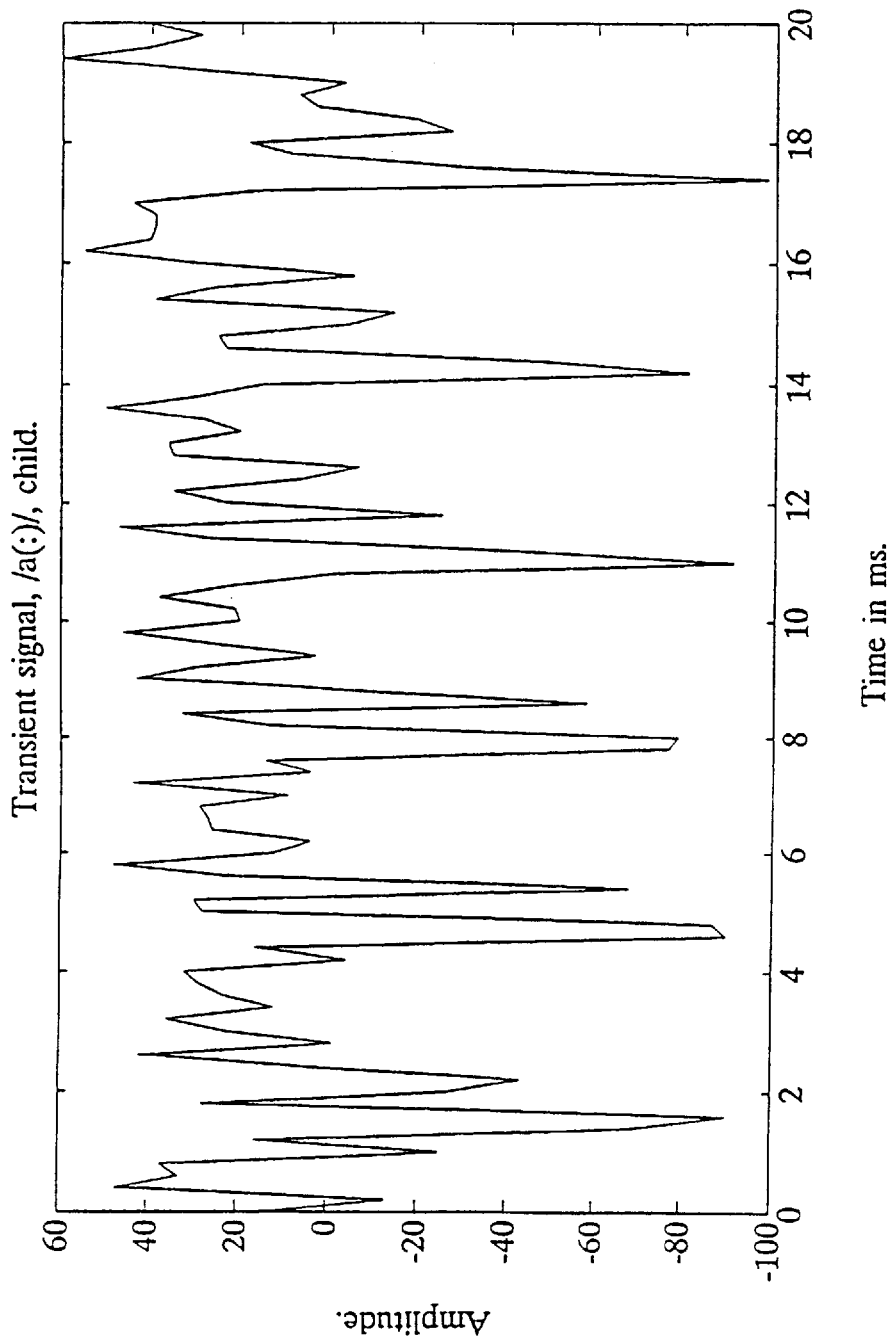
Figure 13P:
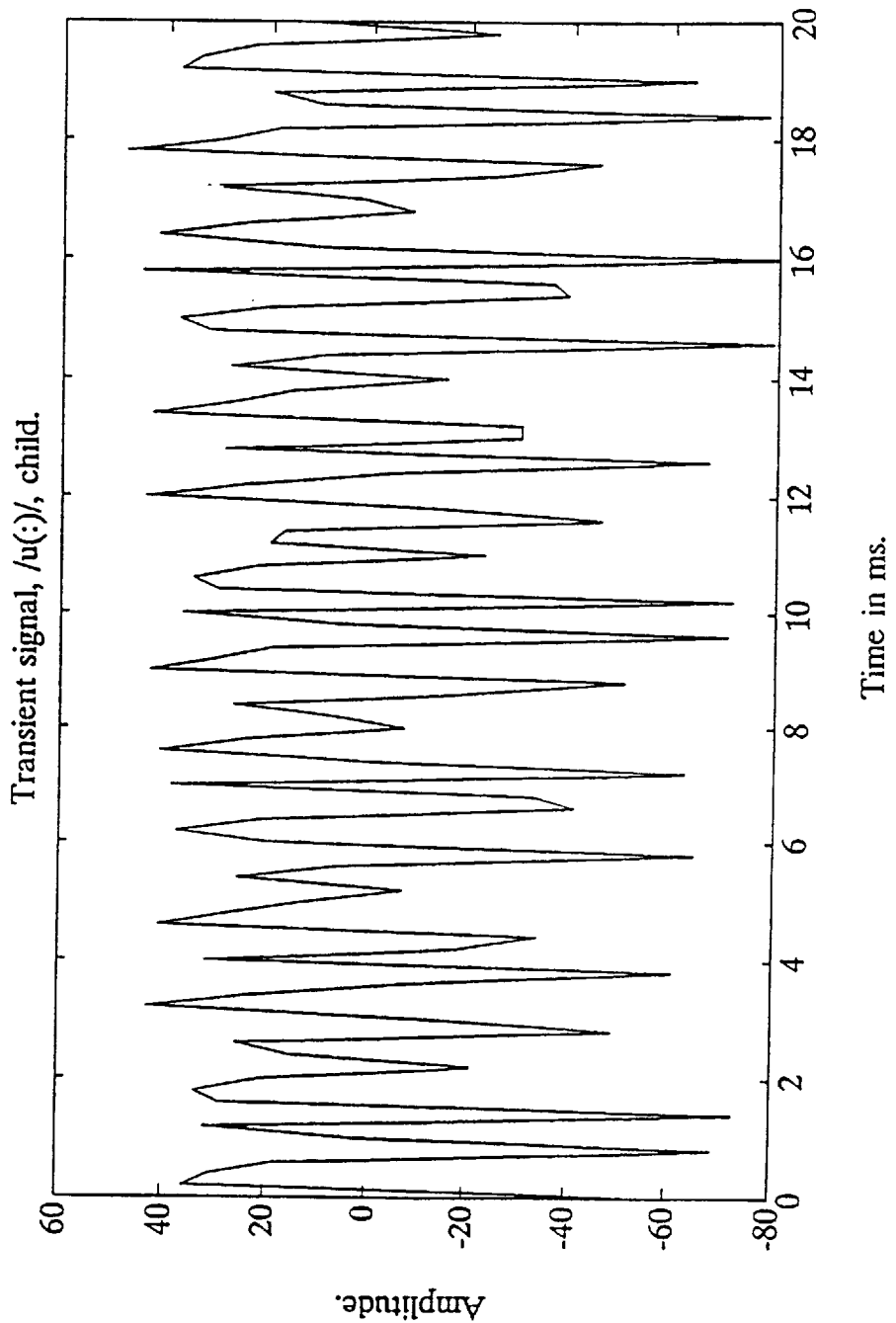
Figure 14A:
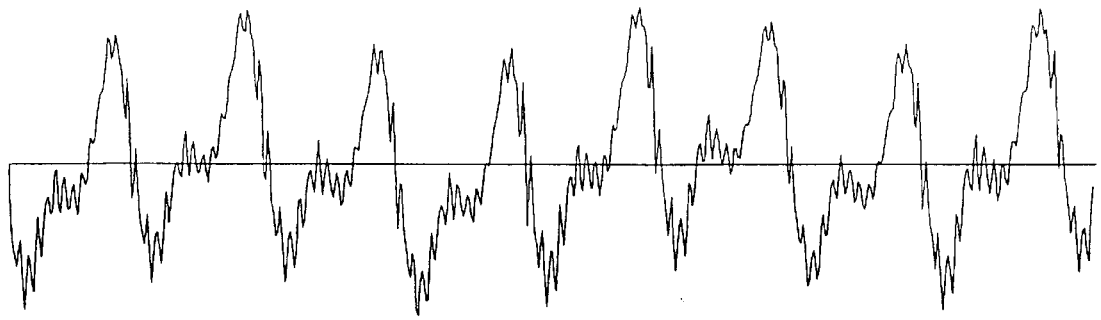
Figure 14B:
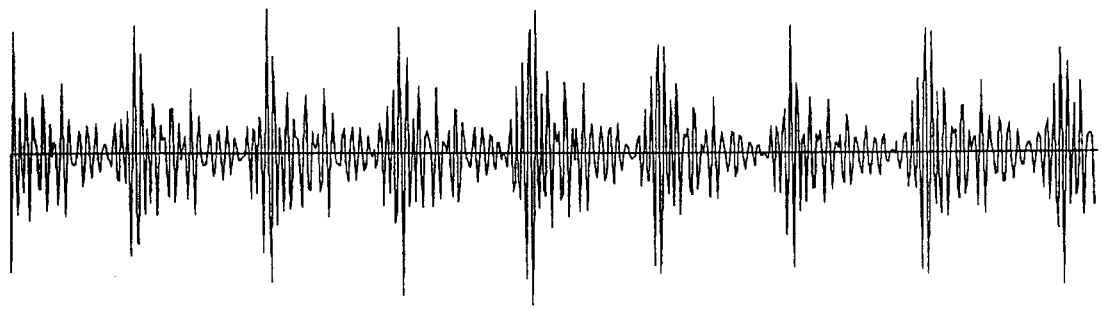
Figure 14C:
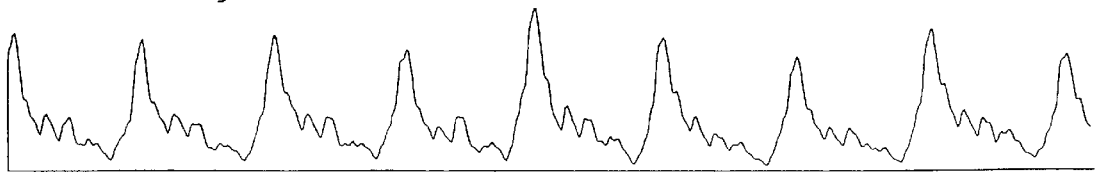
Figure 15A:
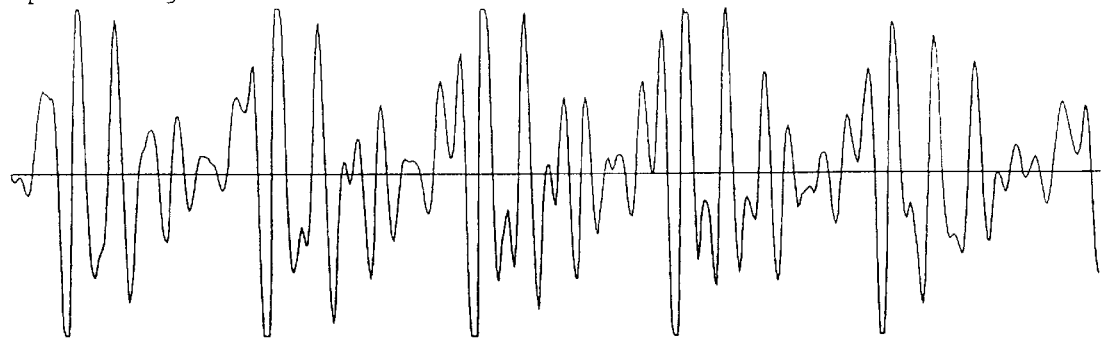
Figure 15B:
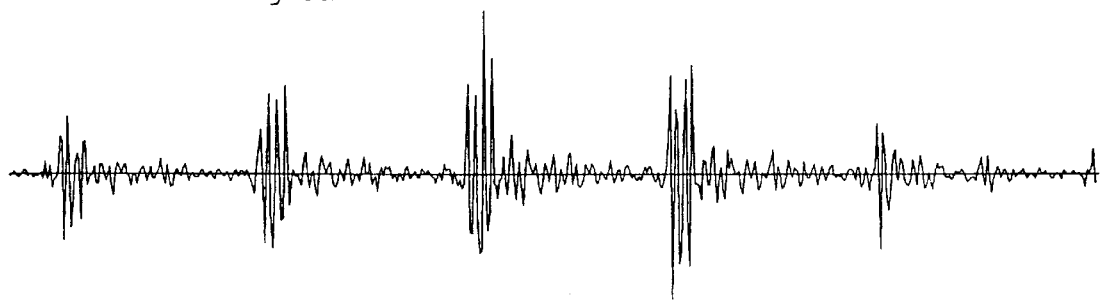
Figure 15C:
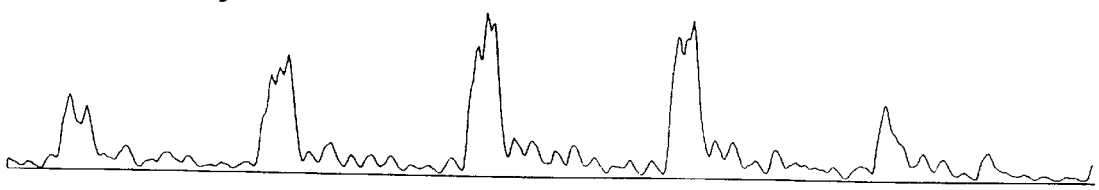
Figure 16A:
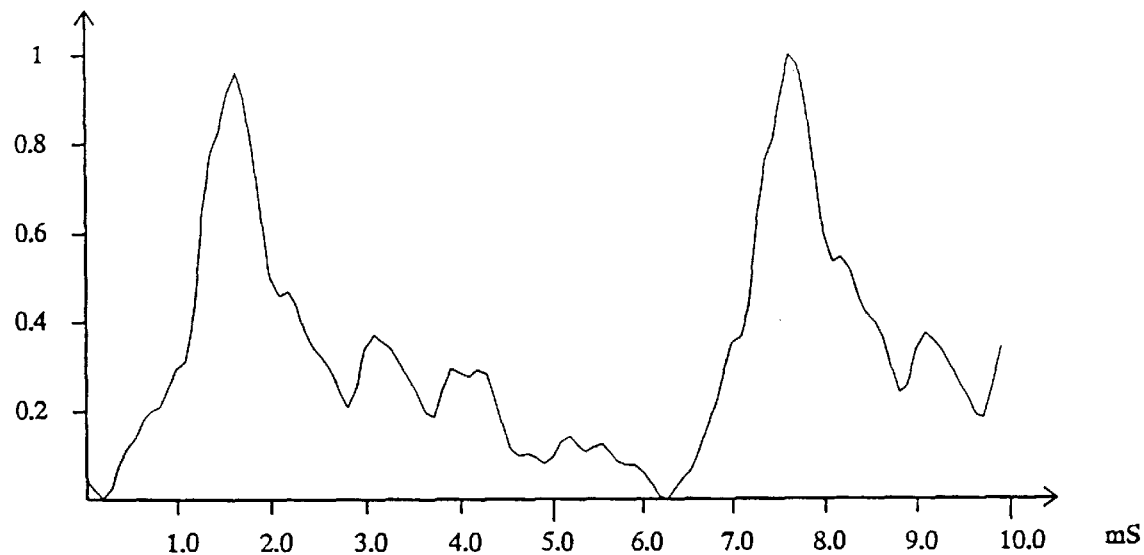
Figure 16B:
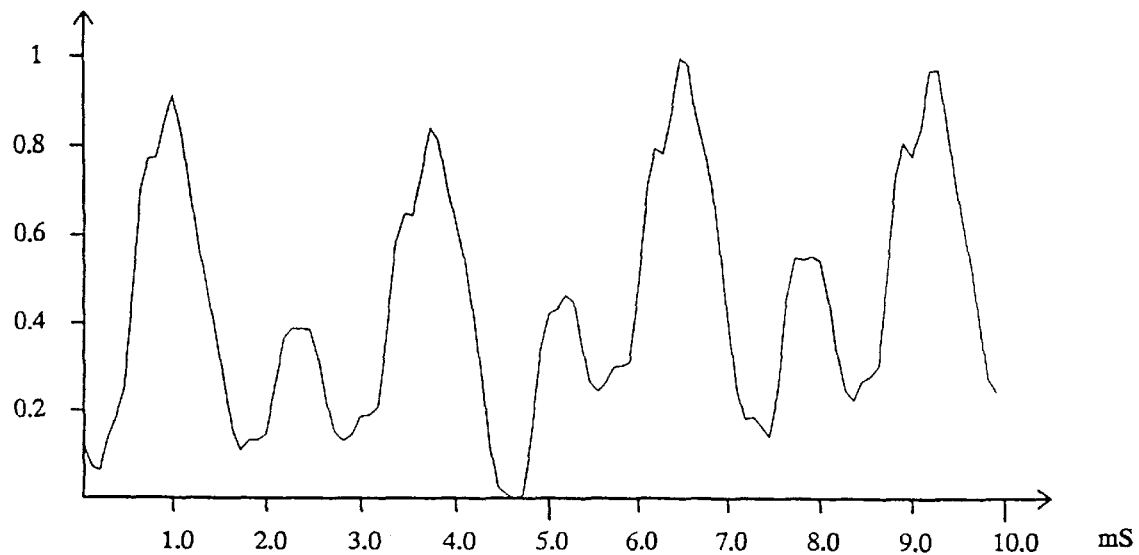
Figure 17A:
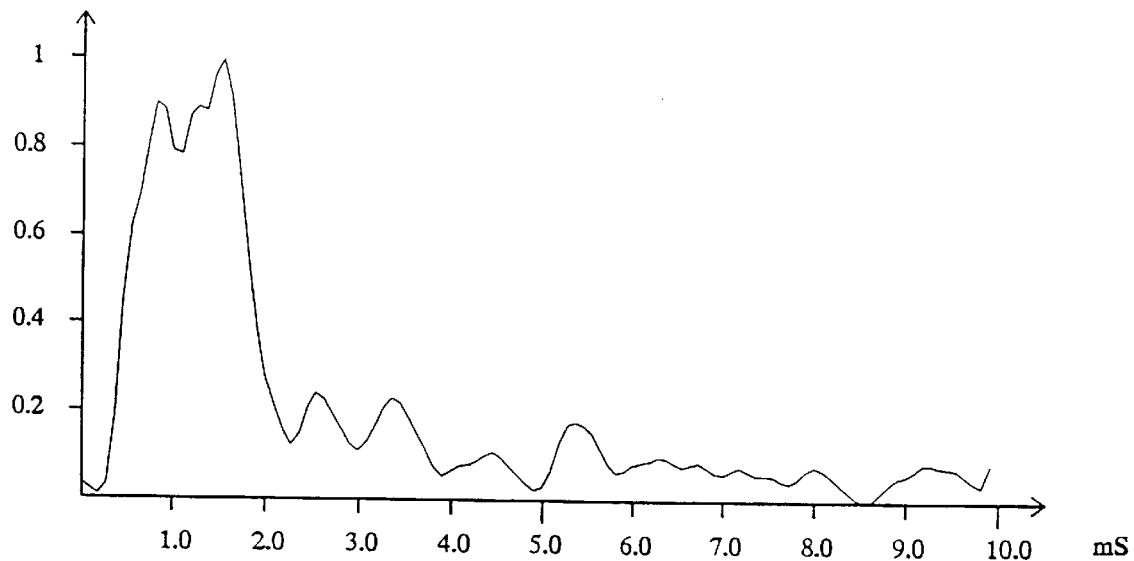
Figure 17B:
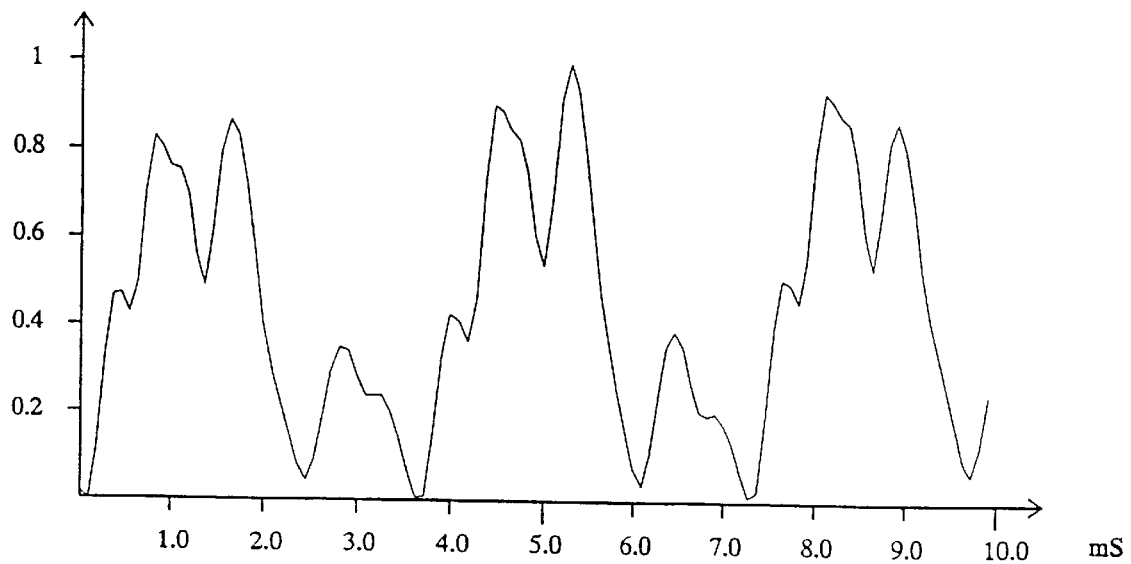
Figure 18:
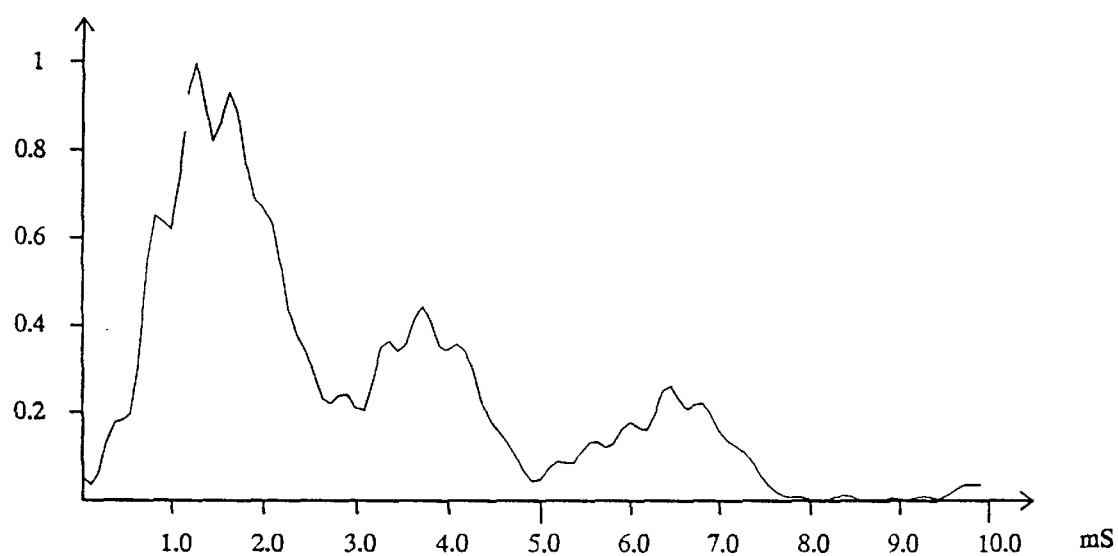
Figure 19:
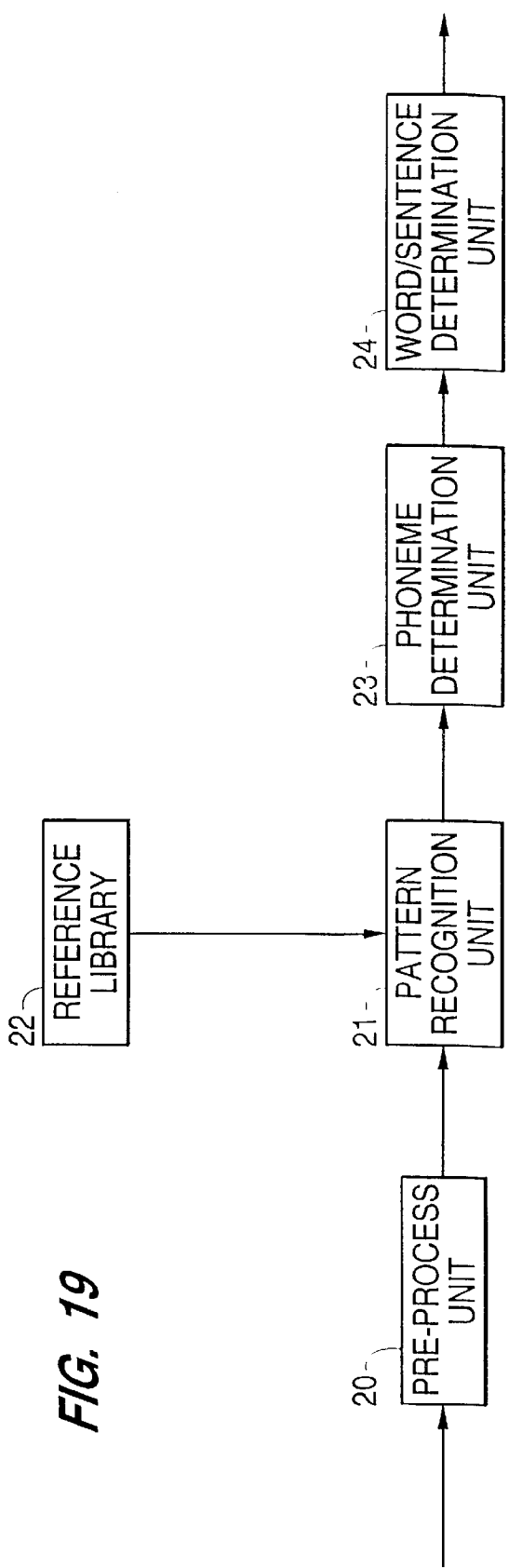

FIG. 1 shows the spectre of a bandpass filter $F(\omega)$ and a lowpass filter $H(\omega)$, FIG. 2 shows the zeros and the poles in the s-plane for an infinite number of bandpass filters, IBP, having identical bandwidth, FIG. 3 shows the zeros and poles in the s-plane for an infinite number of bandpass filters, IBP, having identical Q, FIG. 4 illustrates the impulse response for various root locations in the s-plane, FIG. 5 shows a spectrogram for the words "linear prediction", FIG. 6 illustrates how a summation of an infinite number of bandpass filters, IBP,. can be performed by one bandpass filtration, FIG. 7 illustrates the principle of a transient detection system according to the invention, FIG. 8 shows a block diagram for a transient detection system according to the invention, FIG. 9 shows the characteristics of a preferred highpass filter to be used in the system of FIG. 8, FIG. 10 shows the characteristics of a preferred lowpass filter to be used in the system of FIG. 8, FIG. 11 illustrates the sensitivity of the human ear, FIG. 12 illustrates average formant frequencies for the American vowels /i(:)/, /ae(:)/, /a(:)/, and /u(:)/, FIGS. 13a to 13p show the experimental results of the first transient analysis of the vowels of FIG. 11, FIGS. 14a to 14c show processed curves of the vowel "e" as in "heat", FIGS. 15a to 15c show similar curves as in FIG. 12 for the vowel "o" as in "hop", FIGS. 16a to 16b show normalized time windows for the processed curves of the vowel "e" as in "heat", FIGS. 17a to 17b show normalized time windows for the vowel "o" as in "hop", FIG. 18 shows normalized time windows for the vowel "a" as in "have", FIG. 19 shows a block diagram for a speech recognition system according to the invention, and FIGS. 20–25 show transient pulses for speech synthesis of the phonemes "i" as in "heat", "o" as in "hop", "o" as in "ongaonga", "u" as in the Danish word "hus", "ø" as in the Danish word "øse", and "y" as in the Danish word "lys", respectively.

First, a mathematical explanation of the principles of the invention is given.

A bandpass filter may be represented in the time domain by an impulse response and can be expressed as $$f(t) = h(t)\cos(\omega_c t) \tag{3}$$

where h(t) is the impulse response for a lowpass filter and $\omega_c$ is the centre frequency of the bandpass filter f(t). The term $\cos(\omega_c t)$ may be regarded as representing a frequency shift of the lowpass filter to a bandpass filter with a centre frequency at $\omega_c$. This is illustrated in FIG. 1, where F(ω) and H(ω) are the corresponding frequency characteristics of f(t) and h(t).

Let the IBP filters be composed of a simple bandpass filter, BP, with a zero at origin and two complex poles (complementary) in the left half plan of the complex s-plane and let the poles of the IBP filters be placed in a straight line then:

1) If the bandwidth is identical for all the IPB filters then the rise time and the delay time will be identical for all filters but Q=fc/(fu−fl) will be inversely proportional to the centre frequency fc. The zeros and the poles are shown in FIG. 2.

2) If Q is identical for all filters then the rise time and the delay time will be inversely proportional to the centre frequency while the bandwidth will be proportional to the centre frequency. The zeros and the poles are shown in FIG. 3.

It is assumed that the rise time and the delay time are identical for the IBP filters within the frequency range which is of interest for the analysis of the transient conditions. If this is not the case it is assumed that the brain will compensate for it. The effect is only that the rise time will be slower and the delay time will be longer with falling frequencies (if Q is identical). The rhythm and the shape of the transients will be the same.

In short time analysis the transient component in a signal is a matter of definition. The idea is to get an expression that gives a response corresponding to the response in the cochlea to an abrupt change in the signal energy. An abrupt change in the signal energy corresponds to the transient component in the auditory signal.

The composition of the transient and the steady state component in a signal may be identified by envelope detection, where the steady state component is the DC component in the detected envelope and the transient component is identified as the changes in the level of the envelope.

The transient response may be identified by envelope detection.

The envelope of the impulse response can be expressed as $$ft(t) = [f(t)^2 + \hat{f}(t)^2]^{1/2} \tag{4}$$

where $\hat{f}(t)$ is the Hilbert transform of f(t).

By substituting (3) into (4) we have $$ft(t) = \{[h(t)\cos(\omega_c t)]^2 + [\widehat{h(t)\cos(\omega_c t)}]^2\}^{1/2} \tag{5}$$

For the Hilbert transform we have $$\widehat{u(t)v(t)} = \hat{u}(t)v(t) = u(t)\hat{v}(t) \tag{6}$$

if the spectra for u(t) and v(t) do not overlap.

Hence we have $$ft(t) = \{[h(t)\cos(\omega_c t)]^2 + [h(t)\sin(\omega_c t)]^2\}^{1/2} \tag{7}$$

and $$ft(t) = |h(t)| \tag{8}$$

based on the assumption that the spectrum for h(t) does not overlap the centre frequency $\omega_c$. Under this condition the envelope of the impulse response is independent of the centre frequency. This is illustrated in FIG. 4 which shows how different impulse responses will result in the same envelope.

The result of (8) causes the total envelope for the IBP filters to be the sum of the envelopes for the individual bandpass filters.

An accumulated transient response ftt(t) can thus be expressed by summing ft(t). This summation can be expressed as $$ftt(t) = \int_{\omega_{cl}}^{\omega_{cu}} ft(t, \omega_c) d(\omega_c) \tag{9}$$

and $$ftt(t) = |h(t)|(\omega_{cu} - \omega_{cl}), \tag{10}$$

where $\omega_{cl}$ is the centre frequency for the lower IBP filter and $\omega_{cu}$ is the centre frequency for the upper IBP filter:

FIG. 5 shows a spectrogram for the words "linear prediction" when pronounced by a man. The spectrogram is recorded with bandpass filters with a bandwidth of 300 Hz and centre frequencies in the range from about 150 Hz up to about 4 kHz. The ordinate is the frequency, the abscissa is the time and the black ink is a degree of the signal energy. The horizontal oriented black bands are dominating frequency bands in the speech and are called formants. The vertical thin lines correspond to abrupt energy changes and thus to the transient components of the signal. A spectrogram is usually used for formant analysis and a bandwidth of 300 Hz is not sufficient for transient analysis, but the appearance of the shape of the lines confirm that the transient signal is independent of the centre frequency of the bandpass filters.

As mentioned above the cochlea may be regarded as having an infinite number of bandpass filters, but it would be advantageous to be able to detect the transient signal without the use of a large number of bandpass filters.

FIG. 6 illustrates how a summation of an infinite number of bandpass filters, IBP, can be performed by one bandpass filtration, BP, having a bandwidth that covers the cutoff frequencies of the lower and the upper IBP filter, $IBP_l$ and IBPU. Preferably, the bandpass filter BP should be of the maximum flat delay type, as this type of filter is well suited for preserving the shape of a transient condition.

In practice the simplest way to detect the envelope is to use a rectifier and a lowpass filter, see for example "Communication Systems. An introduction to Signal and Noise in Electrical Communication", McGraw-Hill Kogakusha 1968, A. Bruce Carlson. From equation (10) it can be seen that the accumulated transient component may be detected by performing a highpass filtration, BP, covering the range of IBP that needs to be accumulated before the envelope detection. An envelope detection corresponds to a frequency shift by the centre frequency $\omega_c$ of the bandpass filter to a lowpass filter with half the bandwidth of the bandpass filter. This means that the cutoff frequency of the lowpass filter determines the bandwidth of all the IBP covered by the BP. This principle is illustrated in FIG. 7.

In FIG. 7 the digitalized sound signal S(t) enters a bandpass or highpass filter BP, 10, the output of the bandpass filter is input into a rectifying unit 11, the output of which is input into a lowpass filter LP, 12. The output of the lowpass filter 12 is designated ftt(t) and represents a detection of the envelope and thus a detection of the transient response of the sound signal S(t).

From the mathematical definition of a transient part of a signal it can be concluded that the poles of h(t) will be located on the negative reel axis in the s-plane. This means that the impulse response will not be oscillating around zero (a transient response is a non oscillating signal). From equation (10) it can be seen that the limits $\omega_{cu}$ and $\omega_{cl}$ for the IBP filters is only a question of quantity of ftt(t).

The bandpass filtration, BP, sets the limits for the summation of the transient responses of the IBP filters, and the amplitude characteristic weights the contribution from the IBP filters. If a lowpass filter is used instead of BP, there will be an overlap of the spectrum for h(t) and the centre frequency for the lower IPB filter. The bandpass filter BP should have a band width which at least equals the double of the cutoff frequency of the lowpass filter LP. The band width and the amplitude characteristic can be utilized for optimizing different signal analyses when using the method according to the invention.

In principle the poles of the lowpass filter LP should be located on the negative reel axis for a mathematical transient detecting system. However, when dealing with auditory signals, it is the characteristic of the cochlea which is decisive; but there should preferably be no significant oscillations within the impulse response, as this could make the transient conditions of the auditory signal more indistinct.

The cutoff frequency of the lowpass filter LP is an expression for the transient conditions of the signal, and this frequency should in connection with auditory signals result in a rise time corresponding to the rise time of the cochlea. The cutoff frequency may be regarded as an index of transients, where a low cutoff frequency will result in transient detection of only those signal elements having a slow rise time, and where a high cutoff frequency also will result in detection of signal elements having a fast rise time.

The fact that the nerve pulses from the ear are synchronized to the frequency below about 1.4 kHz and not above indicates that the ear is tone oriented below 1.4 kHz and transient oriented above. In the transient oriented area the nerve pulses are synchronized to transients, corresponding to abrupt energy changes, in the signal.

The cutoff frequencies for the BP should correspond to the transient sensitive range for the cochlea (theoretically it should have an amplitude characteristic corresponding to the sensitive curve for the ear). The sensitivity curve for the human hearing indicates that the lower cutoff frequency must be about 2 kHz and the upper about 5 kHz. The amplitude characteristic for the BP filter will weight the contributions from the individual IBP filters.

From the above discussion a transient detection and analysis system according to the invention may be constructed as shown in the block diagram of FIG. 8. In FIG. 8 a sound signal is input into a microphone 13 the output of which is passed through a lowpass filter 14 before being digitalized by an A/D converter 15. The output of the A/D converter S(t) is lead to a highpass or bandpass filter BP, 10, the output of the bandpass filter is input into a rectifying unit 11 the output of which is input into a lowpass filter LP, 12, see also FIG. 7. The output of the lowpass filter 12 is designated ftt(t) and represents the transient components of the input signal. In order to analyse the transient components, the output signal of the lowpass filter 12 should preferably be lead into equipment for signal analysis or recognition 16.

FIGS. 9 and 10 show the characteristics of a preferred highpass filter and lowpass filter to be used in the systems of FIGS. 7 or 8. The bandpass filter BP to be used as the highpass filter 10 in FIGS. 7 or 8 should have a lower cutoff frequency of at least 2000 Hz, preferably about 3000 Hz. The upper cutoff frequency should be in the range between 4500 and 7000 Hz, preferably about 6000 Hz. The characteristic shown in FIG. 9 has a lower cutoff frequency of 3014 Hz. The lowpass filter LP to be used in FIGS. 7 or 8 should have a higher cutoff frequency in the range of 400–1200 Hz, preferably about 700 Hz. The characteristic shown in FIG. 10 has a higher cutoff frequency of 732 Hz. It would also be possible to construct a transient detection system according to FIGS. 7 or 8 by using a full-wave rectifier. However, it is preferred to use a one-way rectifier as illustrated in FIGS. 7 and 8.

In FIG. 11 the sensitivity of the human ear is illustrated as the response of the cochlea on auditory signals for tones is shown. As already mentioned the perception is tone oriented up to about 1.4 kHz and transient oriented above 1,4 kHz.

As mentioned above and. illustrated in FIG. 6 the total envelope for the IBP filters is obtained by a summation of the envelopes of the individual bandpass filters, and the summation of an infinite or high number of bandpass filters IBP can be performed by one bandpass filtration BP. This principle is used in the diagram shown in FIG. 7. However, a summation of a number of bandpass filters may also be realized by using a filter bank method in which the envelopes of a number of individual bandpass filters are detected and summed. Thus, each branch within the filter bank is composed of a bandpass filter with a specific centre frequency, a rectifying unit and a lowpass filter, and the outputs of the lowpass filters are summed in order to obtain the total envelope.

Now, some introductory experiments illustrated by FIGS. 12 and 13 will be discussed:

Two experiments were carried out in order to evaluate the cutoff frequencies for the BP and the LP filters and to evaluate the suitability of the method for speech recognition.

1. Experiment by listening to an amplitude modulated signal

To have a first indication of the cutoff frequency for the LP filter under controlled conditions, a listening experiment was carried out with an amplitude modulated signal in the sensitive frequency range for the ear. The experiment is somewhat artificial because normally there would not be so intensive a signal in that range and it can not be recommended to verify the experiment because it is very hard to the ear.

The carrier frequency was chosen to 3.5 kHz and the modulation tone was tuned up from a few Hz and upwards. Until 350–400 Hz the envelope signal sounds buzz. After that it sounds first like a hollow /u(:)/ and at 800 Hz like a sharp /i(:)/. Above 800 Hz it was not possible to hear the envelope signal. If the tone is increased further at a given point one will hear different mixed tones.

The sound was of course dominated by the carrier frequency but it was indicated that the cutoff frequency for the LP filter probably has to be less than 1–1.2 kHz.

The modulation index was about 0.75. When it is greater than 1, the introduction of overtones can be observed.

2. Analysis of transient signals for four vowels

Selection of vowels:

FIG. 12 shows average formant frequencies for the American vowels /i(:)/, /ae(:)/, /a(:)/, and /u(:)/ as in heed, had, hod, and who'd for men, women, and children. These vowels represent a good dispersal among vowels so they were selected to the experiment.

The vowels were recorded (with Danish accent) pronounced of a man, a woman, and a child by an ordinary cassette recorder.

Setup for the experiment:

An analog TSD (Transient Signal Detector) was designed in accordance with FIG. 7. The design was based on the operational amplifier LM 833.

The specification for the filters were:

The BP filter was a four orders Chebyshev filter with 1 db ripple. The upper cutoff frequency is about 6.5 kHz and the lower is adjustable from about 550 Hz to 2.6 kHz.

The rectifier was a-full rectifier that converts the negative signal and adds it to the positive signal.

The LP filter was a two orders Butterworth filter designed to have a cutoff frequency at 1.5 kHz (the 3 db cutoff frequency was measured to 2.1 kHz).

Recording vowels and detecting the transient signal:

Four vowels pronounced by a man, a woman, and a child were recorded on an ordinary radio cassette recorder. The transient signal was detected by means of the TSD, converted, and stored on PC by means of an 8 bits A/D converter. The sampling rate when recording was 10 kHz, but when analysing the recorded data only every second set of values was considered, resulting in a sampling rate of 5 kHz. An 8 bits A/D converter gives a poor dynamic range and therefore it was necessary to record the vowels isolated (that means not in a word) and this gives a more uncertain pronunciation.

FIGS. 13a–13p show the experimental results of the first transient analysis of the vowels of FIG. 12.

It is possible to identify the vowel by listening to the transient signal. By visual inspection of time variation of the results it could be observed that the same vowel pronounced by a man, a woman, and a child, respectively, was having almost the same characteristics, even if differences in the fundamental tone were observed. When recording the vowel /a(:)/ as in the Danish word "op", a p-sound was also recorded which is clearly seen from the time variation of the transient signal.

Analysis of the transient signals:

The power in the transient signals varies a lot from vowel to vowel. The signals of the vowels /a(:)/ and /u(:)/ were very low (especially for the man's voice) and it was necessary to turn up the volume for the radio cassette recorder to a high level and it caused a lot of noise.

First, there were made a number of FFT analysis of 20 ms duration and a 5 Khz sampling rate at different starting points in the vowels. The spectra appear to be very outstanding and identical throughout the vowel. This strongly indicates that there is important information in the signal.

In order to analyse common features 20 ms (101 samples) were randomly chosen from each vowel. The time signals were smoothed by a Hamming window and the FFT's were calculated. In FIGS. 13a–13d the power spectra are shown where the three voices are illustrated in the same diagram for each vowel and the corresponding transient signals are shown separately in FIGS. 13e–13h when pronounced by a woman, in FIGS. 13i–13l when pronounced by a man and in FIGS. 13m–13p when pronounced by a child.

The spectra are expected to have the following features:

The spectra of the same vowel pronounced by three different voices will have some common features related to the vowel and some features related to the voice.

The spectra of different vowels pronounced by the same voice will have some features related to the different vowels and some common features from the voices.

Furthermore, it must be expected that the shape of the spectra plays a more important part than the absolute frequencies.

From the power spectra the following can be seen:

/i(:)/ (FIG. 13a)

The most remarkable feature is that the spectra from all three have an outstanding top in the frequency range from 300–400 Hz, they are 50 Hz wide, and there are an outstanding cleft at 200–250 Hz. Furthermore, there is a contribution at 50 Hz. The man's voice has a contribution at 150 Hz which must attribute to a deep voice.

/ae(:)/ (FIG. 13b)

The voices of the woman and of the man have an outstanding cleft at 350 Hz (deeper than 50 db). The mans voice has also in this case a contribution at 150 Hz. The voice of the child does not fit so well into the pattern, this might perhaps be due to an uncertain pronunciation.

/a(:)/ (FIG. 13c)

All three voices have top 250–300 Hz. The frequency range is a bit lower and not so outstanding as for the /i(:)/. Further, there is major contribution at 50 Hz and below for all three voices.

/u(:)/ (FIG. 13d)

The voices of the child and of the woman are real alike and they have a peak at 300 and 350 Hz and they have a deep wide valley at 100 Hz. The man's voice has also a peak and the valley is as wide as it is for the woman and the child but not so deep. The reason for this can be the deep voice and the fact that there is a lot of noise in the signal caused by the radio cassette recorder.

The experiments leading to the results of FIGS. 13a–p can be seen as introductory but the results are highly interesting especially when taking into consideration the simple equipment that has been used with a lot of noise and only 8 bit A/D-converter. In spite of this the results are outstanding. There has been no particular data selection to improve the results and there is therefore no doubt that the transient condition is of decisive importance for speech recognition.

It seems like all information might be located in the frequency range below 500 Hz. If this is the case-then the demand on the sampling frequency will be less than 1.5 kHz and it will be possible to analyse the speech signal very intensively with more parallel processes. It is possible to have more time windows for instance 5, 20, and 40 ms and use spectrum analysis (FFT, LPC, CEPSTRUM, or others) to detect some phonemes and time analysis (correlation or methods) to detect others phonemes.

It is most likely that a more sophisticated design of the TSD with an AGC amplifier as preamplifier and a logarithmic or AGC amplifier after the BP filter in order to compensate for variations in the energy of the bandpass filtered phonemes, will allow very good results to be obtained and cause a very robust speaker independent speech recognition. Better results may be obtained if a 12 or 16 bit A/D converter is used instead of the 8 bit A/D converter.

Further experimental results illustrated in FIGS. 14–18 will be discussed in the following:

The method of extracting transient signal components according to the present invention may also be regarded as a pre-process of the auditory input signal. In order to be able to obtain a better understanding and/or determination of the parameters of the pre-process a software programme were developed, by use of which it is possible to show the output signals and listen to the outcome after each process step of the pre-process.

The analysis of speech signals shown in FIGS. 14 and 15 has been made by means of this software programme running on a Compaq Deskpro 4/66i PC. This type of PC is provided with Microsoft Windows Sound System, a microphone and a codec chip (AD1848) from Analog Devices. The codec chip performs the sampling, the anti aliasing filtration and the A/D conversion.

The speech signals shown in FIGS. 14*a* and 15*a* are recorded by means of this Sound System. The speech signal is sampled with 11025 kHz and 16 bits linear PCM. The passband is greater than 4.9 kHz.

Pretransient signals are shown in FIGS. 14*b* and 15*b*. These signals are the speech signals filtered by a third order IIR digital highpass filter with a cutoff frequency at 3.0 kHz. The filter is a bilinear transformation of a third order Butterworth filter.

The cutoff frequency at 3.0 kHz has been chosen to get the bandpass in the range of the most sensitive area of the cochlea. In this case it means from 3.0 kHz to 4.9 kHz, where 4.9 kHz is given by the codec chip. The high- or bandpass filter will be optimal if it has maximum flat delay characteristic in accordance with equation (10).

The transient signals shown in FIGS. 14*c* and 15*c* are the pretransient signal rectified and filtered by a second order IIR digital lowpass filter with a cutoff frequency at about 700 Hz. The filter is a bilinear transformation of a second order Butterworth filter.

The lowpass filter shall preserve the shape of the transient pulse corresponding to a transient response in the cochlea, so that a filter which is able to do this will be an optimal filter. The nerves in the cochlea are able to launch nerve pulses with a frequency up to about 1.4 kHz. A bandwidth for the IBP filters in the transient oriented area at 1.4 kHz are transformed by the envelope detection to a cutoff frequency for a lowpass filter at 700 Hz, which is the reason why a cutoff frequency at about 700 Hz has been chosen.

The transient signal may be regarded as an expression for the energy change in the signal.

All the signals presented in FIGS. 14 and 15 are normalized to a maximum signal level, which means that the largest absolute signal value is equal to 32766. The abscissas in FIGS. 14 and 15 represent a time interval of 50 ms and the ordinates in FIGS. 14*a*, 15*a* and FIGS. 14*b*, 15*b* represent the sound pressure of the corresponding speech signal whereas the ordinates of FIGS. 14*c*, 15*c* represent the energy of the corresponding transient speech signal.

It is possible to listen to the speech, the pretransient and the transient signals, corresponding to FIGS. 14*a*, 15*a*, 14*b*, 15*b* and 14*c*, 15*c*, respectively. One of the main demands for selecting the filter characteristics is that the signals have to maintain a sound which is close to the original speech signal when listening to the above mentioned signals.

Referring to the system illustrated in FIG. 7, FIG. 14 shows curves of the vowel "e" as in "heat", when pronounced by a man, where (a) shows the speech signal before filtration is corresponding to the digitalized input signal S(t) in FIG. 7, (b) shows the signal after a highpass filtration corresponding to the output signal of the bandpass filter 10 in FIG. 7, and (c) shows the signal after rectifying and lowpass filtering corresponding to the output signal of the lowpass filter 12 in FIG. 7.

FIG. 15 shows similar curves as in FIG. 14 for the vowel "o" as in "hop", The rise and fall time and the width or duration of the transient pulse is observed to be of importance for the sound in a vowel. FIGS. 16–18 give examples of measured transient pulses. The time window of the vowel "e" as in "heat", when pronounced by a man, shown in FIG. 16*a* corresponds to the processed signal shown in FIG. 14*c*. The corresponding time window when the vowel "e" as in "heat" is pronounced by a child is shown in FIG. 16*b*. From FIGS. 16*a* and 16*b* it can be observed that the leading and lagging edges of the most dominant pulses are sharp with a rise and fall time in about 0.4 ms or less and that the width of the dominant pulses is about 0.8 ms when measured at the level of about 50%.

The time window of the vowel "o" as in "hop", when pronounced by a man, shown in FIG. 17*a* corresponds to the processed signal shown in FIG. 15*c*. The corresponding time window when the vowel "o" as in "hop" is pronounced by a child is shown in FIG. 17*b*. From FIGS. 17*a* and 17*b* it can be observed that the leading and lagging edges of the most dominant pulses are sharp with a rise and fall time in about 0.5 ms but the width of the dominant pulses is about 1.5 ms when measured at the level about 50%. The ditch in the dominant pulses of FIG. 17*b* is not deep enough to influence the perception. It should be noted that the vowel "o" as in "hop" is a sharp vowel, and a more soft vowel will have a more slow lagging edge.

FIG. 18 shows the time window for the processed signal of the vowel "a" as in "have" when pronounced by a man. It is to be observed that the shape of the transient pulse has softer leading and lagging edges than the pulses shown in FIGS. 16–17.

Thus, from the above results it may be concluded that the perception of a vowel is given by the shape of the transient pulse. It is further to be concluded that by analysing the transient components or pulses which have been extracted from the auditory signal by way of the above mentioned method of signal processing, the vowels or phonemes of the speech signal may be recognised by identifying the shape of the transient pulse or pulses.

In a vowel or phoneme the transient pulse is repeated and the repetition frequency gives the perception of the pitch. In FIG. 16*a* the time period between two succeeding pulses is about 6 ms corresponding to a man's pitch at 170 Hz and in FIG. 16*b* the time period between two succeeding pulses is about 3.5 ms corresponding to a child's pitch at 280 Hz Thus, it is also to be concluded that by analysing the transient component or pulses which have been extracted from the auditory signal by way of the above mentioned method of signal processing, the pitch of the speech signal may be determined by determining the time period between the transient pulses.

Thus, when analysing auditory signals according to a preferred embodiment of the present invention, it is taken into account that the identity of the sound signal is preserved during the signal processing which includes a highpass filtration followed by a rectification and a lowpass filtration of the input signal.

From the above discussion it should be understood that the present invention provides a method which is very suitable for use in speech recognition.

FIG. 19 shows a block diagram for a speech recognition system according to the invention. In this system a pre-process unit 20 is provided which comprises the bandpass filter 10, rectifying circuit 11 and lowpass filter 12 of FIG. 7. Thus, the pre-process unit, which most conveniently may be integrated within a single integrated circuit or chip, is a transient detecting unit in accordance with the method of the present invention. The system further comprises units which are normally used in speech recognition systems, such as a pattern recognition unit 21 connected to a reference library 22, a unit for phoneme determination 23 and a unit for word/sentence determination 24. The system shown in FIG. 19 uses template matching but alternative approaches may be used in a recognition system.

The reference library 22 of FIG. 19 should store a library corresponding to the shapes which can be generated by the pre-process unit 20.

It should be understood that a single chip pre-process unit also may comprise the lowpass filter 14 and or the A/D converter 15 as shown in FIG. 8.

It is to be understood that a pre-process according to the present invention could be used in many other electronic systems where speech or sound analysis, recognition, coding and/or decoding is required, such as quality measurement of audio products or systems, such as loudspeakers, hearing aids, and telecommunication systems, or for quality measurement of acoustic conditions. The pre-process may also be used in connection with speech compression and decompression in narrow band telecommunication.

As illustrated in FIG. 10 the preferred cutoff frequency of the lowpass filter 12 used in a pre-process unit should be below 1 kHz. Thus, all the necessary signal information of the auditory signals is represented within a rather narrow frequency range of 1 kHz. This should be compared to the frequency band of around 9000 bits per second which is used within the GSM mobile telecommunication system for the communication of speech signals. By using the pre-process method or unit of the present invention it should be possible to decrease the frequency band used for telecommunication down to about 1000 bits per second which would result in great savings within this area of communication.

Thus, it should be understood that the present method is very well suited for optimizing the bandwidth within narrow band telecommunicaton and it is within the scope of the invention that when transmitting an auditory signal in a telecommunication system, the signal should be processed by using the pre-process described herein before being transmitted and received by a receiver. It it preferred that prior to transmission of the processed signal, the signal is coded into a digital representation, and the coded signal is decoded in the receiver so as to reestablish transient pulse shapes perceived by the animal ear such as the human ear as representing the distinct sound pictures of the auditory signal.

During the above mentioned digital transmission the bandwidth may be chosen so as to fulfil different requirements to the quality of the received, decoded and reestablished transient pulse. Thus, a bandwidth of at the most 4000 bits per second may be selected, but it should be possible to obtain a good quality of the reestablished pulse by using a bandwidth around 2000 bits per second. However, it is preferred that the bandwith is in the interval of 800–2000 bits per second. It is to be noted that for telecommunicating systems where a high system performance is preferred as opposed to a high quality of the reestablished signal, such as for example in military systems, a bandwidth about 400 bits per second may be selected.

When transmitting the digital signals it is preferred that the digital information comprises information about leading edge, lagging edge, and duration of the transient pulse representing the processed auditory signal. It is also preferred that a second and further pulses in a sequence of identical pulses are represented by a digital sign indicating repetition when transmitted.

It is also an object of the present invention to provide a method to be used in speech synthesis.

From the discussion of the experimental results of FIGS. 14–18 it should be understood that the sound of each vowel or phoneme might be given by the shape of a dominating transient pulse corresponding specifically to that phoneme. From experiments it has been concluded that transient pulses similar to the processed pulses of FIGS. 16–18 hold the necessary information in order to generate the sound of the phoneme.

By use of the software developed for the transient analysis illustrated in FIGS. 14–18 it is possible to create a simple transient signal by placing points in a system of coordinates where the ordinate is the amplitude and the abscissa is the time in ms. One transient pulse may be created by placing one or several points and interpolate a line between the points either by a straight line or a sine curve and define a period. The signal is repeated for 300 ms and it is possible to listen to the signal when converted by a D/A converter in the codec chip.

It should be noted that the pulse rise time or the form of the leading edge, the duration of the pulse, and the fall time or the form of the lagging edge are all important features for identification, representation and/or generation of transient pulses for use in speech recognition and/or synthesis. These features may also be used in connection with speech compression.

This is illustrated in FIGS. 20–25 which show how transient pulses used for speech synthesis or identification should be formed for the phonemes "e" as in "heat", "o" as in "hop", "o" as in "ongaonga" or as in the Danish word "Ole", "u" as in the word "who", "ø" as in the Danish word "øse", and "y" as in the Danish word "lys", respectively. The pulses are repeated within a period of 5 ms.

Figure 20:
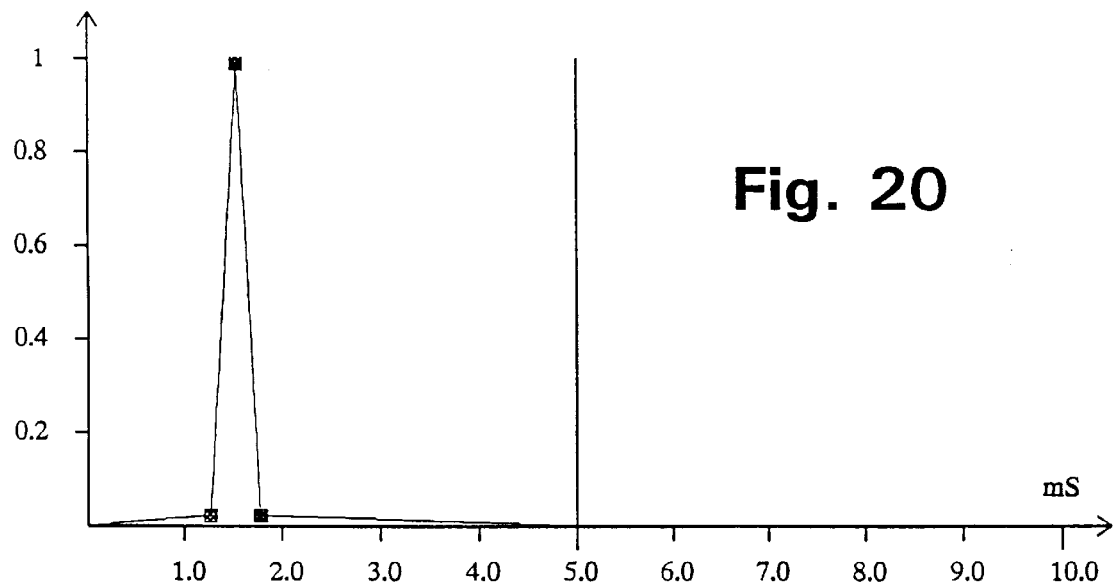

From FIG. 20 it can be seen that the phoneme "i" as in "heat" could be formed by a very short pulse having a duration in the range of 0.3–1.1 ms, with a rise time of the leading edge being in the range of 0.3–0.5 ms. The fall time of the lagging edge should also be in the range of 0.3–0.5 ms.

Figure 21:
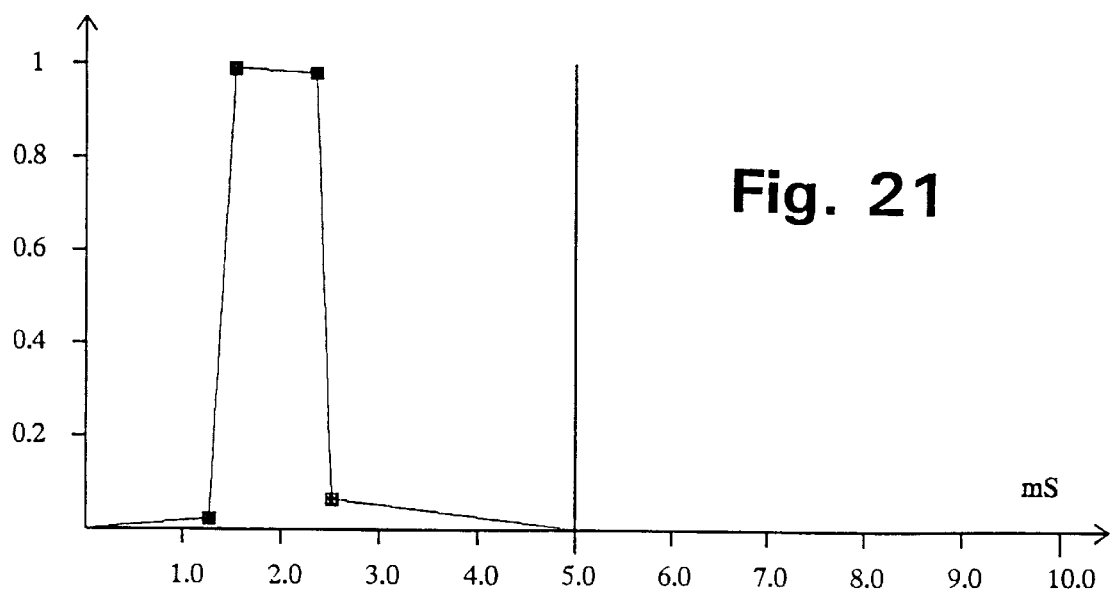

Similarly it is observed from FIG. 21 that the phoneme "o" as in "hop" could be formed by a pulse having a duration in the range of 1.3–1.8 ms, with a rise time of the leading edge being in the range of 0.3–0.5 ms. The fall time of the lagging edge should be in the range of 0.3–0.5 ms.

Figure 22:
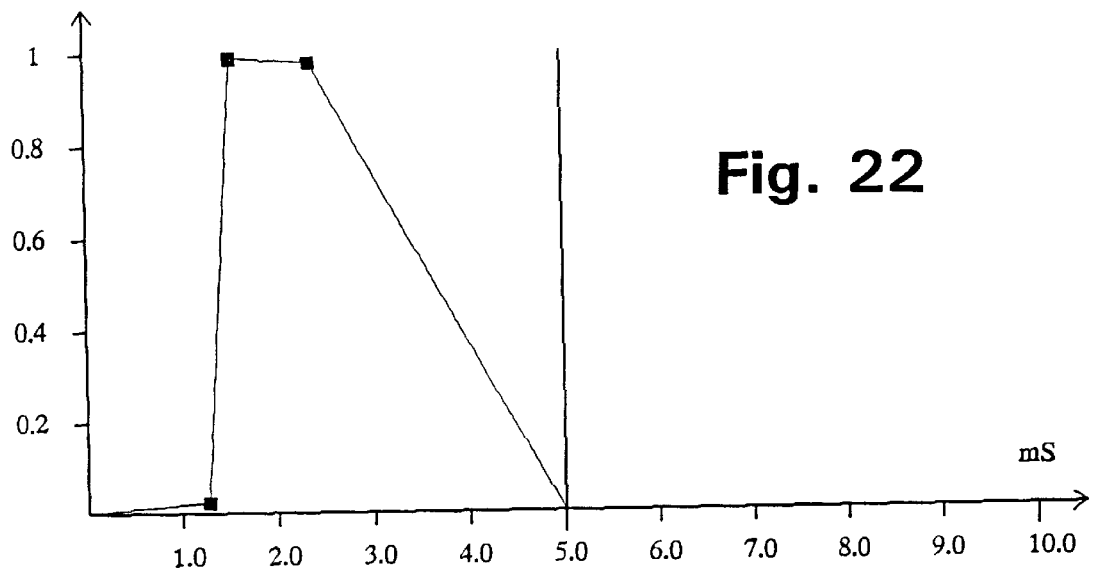

From FIG. 22 it is observed that the phoneme "o" as in the Danish word "Ole" could be formed by a pulse having a duration in the range of 1.3–1.8 ms in the upper part of the pulse, with a rise time of the leading edge being in the range of 0.3–0.5 ms. The fall time of the lagging edge for this phoneme may vary, but should be in the range of 1.0–2.0 ms.

Figure 23:
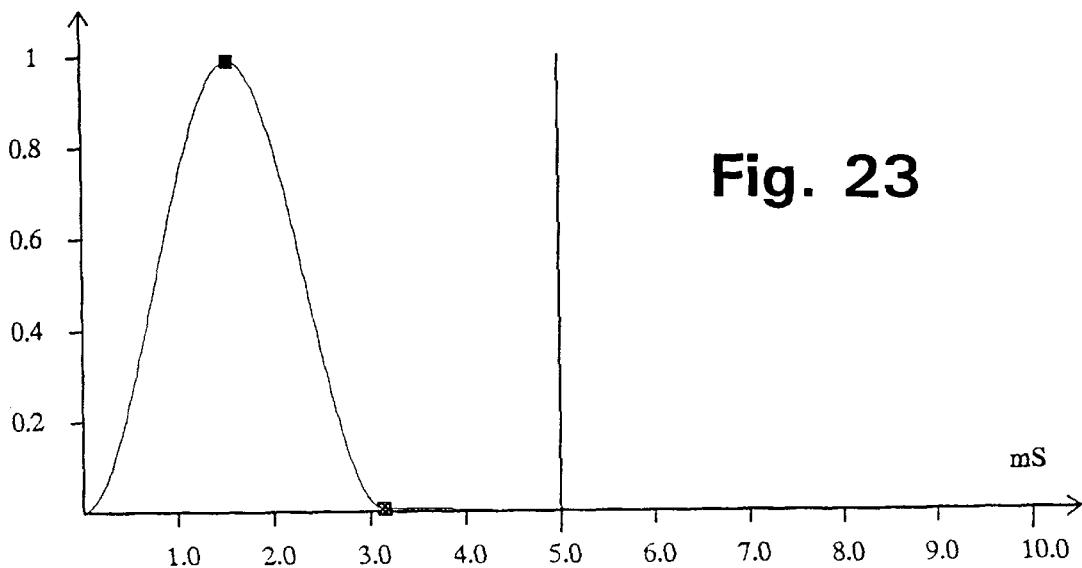

From FIG. 23 it is observed that the phoneme "u" as in the word "who" could be formed by generating a transient pulse with a sine curve interpolation and a duration in the range of 1.0–2.0 ms. The preferred duration should be about 1.5 ms.

Figure 24:
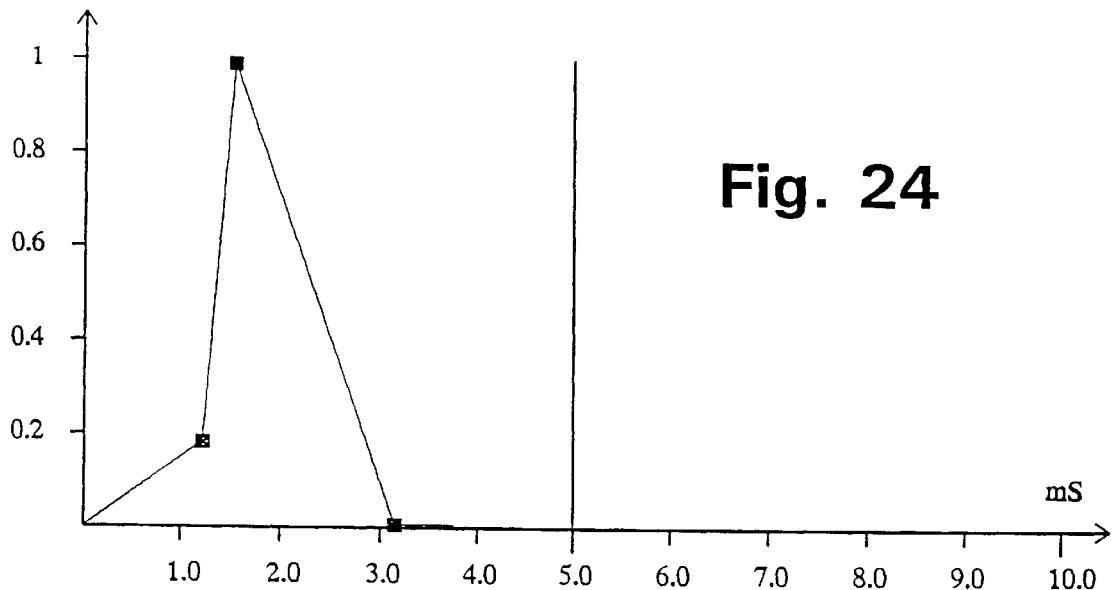

FIG. 24 show the pulse of the phoneme "ø" as in the Danish word "øse". Here the leading edge may have a rise time in the range of 0.4–0.6 ms. The fall time of the lagging edge should be in the range 1.0–2.0 ms.

Figure 25:
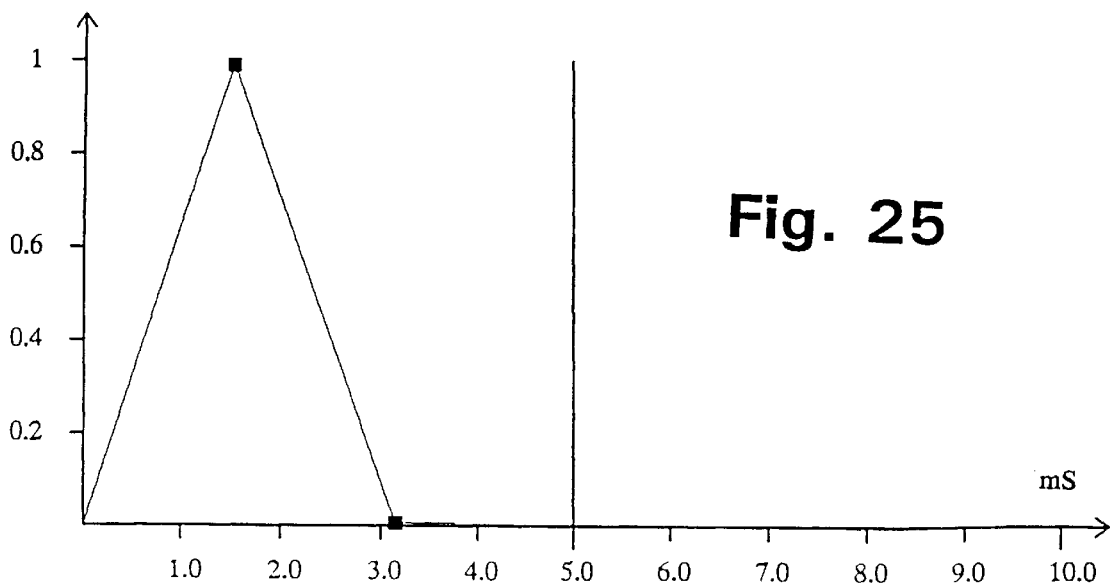

FIG. 25 show the pulse of the phoneme "y" as in the Danish word "lys". Here the leading edge may have a rise time in the range of 1.0–2.0 ms. The fall time of the lagging edge should also be in the range 1.0–2.0 ms.

When synthesizing human speech in accordance with the above mentioned principles of the invention it is preferred to generate a series of transient pulses corresponding to the series of phonemes which constitutes the speech to be synthesized. It is furthermore preferred that the series of phonemes is established from a series of letters using rule-based conversion.

It should be understood that the principles of the invention also can be used for quality measurement of audio products. In such a measurement a well defined transient signal should be transmitted to the audio product, and the distorsion of the response can be measured. The distorsion may be measured by using a pre-process in accordance with the principles illustrated in FIG. 7.

The principles of the invention may also be used in hearing aids in order to improve noise suppresion in speech signals.

A library of features representing characteristic shapes of the transient pulses may be used for identifying the speech signal and separate the speech signal from the noise background.

The experiments presented have, for the first time, shown some common features for phonemes which are very simple to recognize and generate, but which could be of great significance within the whole area of recognition and generation of speech or auditory signals.

The performance of the method and system of the present invention is described in the time domaine. It is however to be understood that the transient signals, components and/or pulses being described in the time domaine also could be given a corresponding description in the frequency domaine, which would naturally be within the scope of the invention.

It is also to be noted that the methods of signal processing described above could be performed either digitally, electronically by use of analog components, mechanically, or by any combination thereof. Such methods of processing would also be within the scope of the invention.

I claim:

1. A method of using a shape of an abrupt energy change in an auditory signal for identifying or representing distinct sound pictures which can be perceived by an animal or human ear, said method comprising the step of:
deriving, from the auditory signal, at most one transient signal including transient pulses representing abrupt energy changes in the auditory signal having a rise time of at most 2 ms.

2. The method according to claim 1, wherein the transient signal is derived from the auditory signal by envelope detection.

3. The method according to claim 1, wherein the distinct sound picture is a phoneme.

4. A method according to claim 1, wherein said method is used in speech recognition.

5. A method according to claim 1, wherein said method is used in speech compression.

6. A method according to claim 1, used for synthesizing human speech, wherein a series of the transient pulses are generated, corresponding to a series of phonemes which constitute the human speech to be synthesized.

7. A method according to claim 6, wherein the series of phonemes is established from a series of letters using rule-based conversion.

8. A method according to claim 1, used in quality-measurement of audio products, the audio products being loudspeakers, hearing aids or telecommunication systems.

9. A method according to claim 1, used in quality-measurement of acoustic conditions in a room or in an open environment.

10. A method for identifying, in an auditory signal, energy changes which can be perceived by an animal or human ear as representing a distinct sound picture the method comprising the steps of:
deriving, from the auditory signal, at most one transient signal including transient pulses representing the abrupt energy changes in the auditory signal having a rise time of at most 2 ms,
selecting a dominant pulse of the transient pulses in the transient signal, and
comparing a shape of the dominant pulse with predetermined transient signal pulses representing distinct sound pictures.

11. A method according to claim 10, wherein the shapes of the transient pulses are obtained by envelope detection of a transient response of an energy change in the auditory signal.

12. A method according to claim 10, wherein the shape of a leading edge of the transient pulses is identified.

13. A method according to claim 12, wherein the shape of the leading edge is determined by determining a rise time and a slope and/or slope variation of at least part of the leading edge.

14. A method according to claim 13, wherein the rise time and the slope and/or slope variation of at least a top part of the leading edge is determined.

15. A method according to claim 13, wherein the top part is a part beginning substantially at a point where the slope is maximum.

16. A method according to claim 15, wherein the rise time and the slope and/or slope variation of the leading edge is determined based on at least 5 samples.

17. A method according to claim 12, wherein the identification of the shape of the leading edge is performed by comparison with a library of references.

18. A method according claim 17, wherein the library of references with which comparison is made is selected based on the rise time of the leading edge.

19. A method according to claim 10, wherein a duration of the transient pulses is identified.

20. A method according to claim 19, wherein the duration of the transient pulses is determined as a distance from a leading edge to a lagging edge at a predetermined amplitude.

21. A method according to claim 20, wherein the predetermined amplitude is an amplitude of at most 50% of a maximum amplitude of the pulse.

22. A method according to claim 12 wherein the transient pulses which cannot be perceived by the animal ear are discarded from identification.

23. A method according to claim 22, wherein a transient pulse having a leading edge with an amplitude of less than 50% of an amplitude of a preceding pulse and an onset time of less than 3.5 ms, is disregarded.

24. A method according to claim 12, wherein the shape of a lagging edge of the transient pulses is identified.

25. A method according to claim 24, wherein the shape of the lagging edge is determined by determining a fall time and a slope and/or slope variation of at least part of the leading edge.

26. A method according to claim 12, wherein a time period between leading edges of the transient pulses which can be perceived by the animal ear is determined.

27. A method according to claim 26, wherein, prior to transmission of the processed signal, the signal is coded into a digital representation, and the coded signal is decoded in the receiver so as to reestablish transient pulse shapes perceived by the animal ear such as the human ear as representing the distinct sound pictures of the auditory signal.

28. A method according to claim 10, used in speech recognition.

29. A method according to claim 5, used in speech compression.

30. A method according to claim 10, used for synthesizing human speech, a series of the transient pulses are generated, corresponding to a series of phonemes which constitute the human speech to be synthesized.

31. A method according to claim 30, wherein the series of phonemes is established from a series of letters using rule-based conversion.

32. A method according to claim 10, used in quality-measurement of audio products, the audio products being loudspeakers, hearing aids or telecommunication systems.

33. A method according to claim 10, used in quality-measurement of acoustic conditions in a room or in an open environment.

34. A system for processing an auditory signal to reduce the bandwidth of the auditory signal with substantial retention of information of the auditory signal, comprising the steps of:
means for extracting the transient component corresponding to an abrupt energy change of the auditory signal, and
means for detecting an envelope of the transient component, said means for detecting the envelope, deriving from the transient component, at most one transient signal including transient pulses representing abrupt energy changes having a rise time of at most 2 ms.

35. A system according to claim 34, further comprising means for identifying or representing the abrupt energy changes based on a shape of the transient pulses.

36. A system according to claim 34, wherein said means for extracting includes a bandpass filter or a highpass filter.

37. A system according to claim 36, wherein a lower cutoff frequency of the bandpass or highpass filter is at least 2 kHz.

38. A system according to claim 36, wherein an upper cutoff frequency of the bandpass filter is in a range between 4.5 and 7 kHz.

39. A system according to claim 34, wherein said means for detecting includes a rectifier and a lowpass filter.

40. A system according to claim 39, wherein the rectifier is a one-way rectifier.

41. A system according to claim 39, wherein a cutoff frequency of the lowpass filter is in a range of 400–1000 Hz.

42. A system according to claim 34, wherein said means for detecting includes a filter bank.

43. A method for processing an auditory signal to reduce a bandwidth of the auditory signal with substantial retention of information of the auditory signal, comprising the steps of:
extracting a transient component corresponding to an abrupt energy change of the auditory signal; and
detecting an envelope of the transient component to obtain, from the transient component, at most one transient signal including transient pulses representing abrupt energy changes having rise times of at most 2 ms.

44. A method according to claim 43, wherein transient pulses of the auditory signal, which can be perceived by an animal or human ear, as representing a distinct sound picture, are identified.

45. A method according to claim 44, wherein the distinct sound picture is a phoneme.

46. A method according to claim 44, wherein a shape of a leading edge of the transient pulses is identified.

47. A method according to claim 46, wherein the shape of the leading edge is determined by determining a rise time and a slope and/or slope variation of at least part of the leading edge.

48. A method according to claim 47, wherein the rise time and the slope and/or slope variation of at least a top part of the leading edge is determined.

49. A method according to claim 48, wherein the top part is a part beginning substantially at a point where the slope is maximum.

50. A method according to claim 47, wherein the rise time and the slope and/or slope variation of the leading edge is determined based on at least 5 samples.

51. A method according to claim 46, wherein the identification of the shape of the leading edge is performed by comparison with a library of references.

52. A method according to claim 51, wherein the library of references with which comparison is made are selected based on the rise time of the leading edge.

53. A method according to claim 46, wherein the transient pulses which cannot be perceived by the animal ear are discarded from identification.

54. A method according to claim 53, wherein a transient pulse having a leading edge with an amplitude of less than 50% of an amplitude of a preceding pulse and an onset time of less than 3.5 ms, is disregarded.

55. A method according to claim 46, wherein the shape of a lagging edge of the transient pulses is identified.

56. A method according to claim 55, wherein the shape of the lagging edge is determined by determining a fall time and a slope and/or slope variation of at least part of the leading edge.

57. A method according to claim 46, wherein a time period between leading edges of the transient pulses, which can be perceived by the animal ear, is determined.

58. A method according to claim 57, wherein the time period between leading edges which have a distance of at least 3 ms from each other, is determined.

59. A method according to claim 44, wherein a duration of the transient pulses is identified.

60. A method according to claim 59, wherein the duration of the transient pulses is determined as a distance from a leading edge to a lagging edge at a predetermined amplitude.

61. A method according to claim 60, wherein the predetermined amplitude is an amplitude of at most 50% of a maximum amplitude of the transient pulses.

62. A method according to claim 43, further comprising the steps of:

transmitting the transient signal, and receiving the transient signal with a receiver, to thereby telecommunicate the auditory signal.

63. A method according to claim 62, wherein, prior to transmission of the transient signal, the transient signal is digitally coded, and the coded signal is decoded in the receiver so as to reestablish the transient pulses perceived by the animal or human ear, as representing distinct sound pictures of the auditory signal.

64. A method according to claim 63, wherein transmission of the digitally coded transient signal is performed at a bandwidth of at most 4000 bits per second.

65. A method according to claim 64, wherein the bandwidth is at most 2000 bits per second.

66. A method according to claim 65, wherein the bandwidth is in an interval of 800–2000 bits per second.

67. A method according to claim 63, wherein the digitally coded transient signal includes information about a leading edge, a lagging edge, and a duration of each transient pulse.

68. A method according to claim 63, wherein a second and subsequent pulses in a sequence of identical pulses are represented by a digital sign indicating repetition.

69. A method according to claim 43, wherein the transient component is extracted by bandpass filtering or highpass filtering.

70. A method according to claim 69, wherein a lower cutoff frequency of the bandpass or highpass filtering is at least 2 kHz.

71. A method according to claim 69, wherein an upper cutoff frequency is in a range between 4.5 and 7 kHz.

72. A method according to claim 43, wherein the envelope is detected by rectification and lowpass filtering.

73. A method according to claim 72, wherein the envelope is detected by one-way rectification.

74. A method according to claim 72, wherein a cutoff frequency of the lowpass filtering is in a range of 400–1000 Hz.

75. A method according to claim 43, wherein the envelope is detected by bandpass filtering, using a bank of filters.

76. A method according to claim 43, used in speech recognition.

77. A method of identifying or representing a phoneme "e" as in "heat", comprising the steps of:

deriving at most one transient signal corresponding to abrupt energy changes of the phoneme; and identifying or generating a transient pulse in the transient signal with a rise time of a leading edge of at most 0.5 ms and a duration of at most 1.1 ms.

78. A method according to claim 77, wherein the rise time of the leading edge is at most 0.4 ms.

79. A method according to claim 77, wherein a duration is at most 1.0 ms.

80. A method according to claim 77, wherein a fall time of a lagging edge is at most 0.3 ms.

81. A method according to claim 77, wherein said method is used in speech recognition.

82. A method according to claim 77, used in speech compression.

83. A method according to claim 77, used for synthesizing human speech, further comprising the step of:

replicating the transient pulse to provide a series of the transient Pulses corresponding to a series of phonemes wherein the series of the transient pulses are generated corresponding to the series of phonemes which constitute the human speech to be synthesized.

84. A method according to claim 83, wherein the series of phonemes is established from a series of letters using rule-based conversion.

85. A method according to claim 77, used in quality-measurement of audio products, the audio products being loudspeakers, hearing aids or telecommunication systems.

86. A method according to claim 77, used in quality-measurement of acoustic conditions in a room or in an open environment.

87. A method of identifying or representing a phoneme "o" as in an English word "ongaonga" or a Danish word "Ole", comprising the steps of:

deriving at most one transient signal corresponding to abrupt energy changes of the phoneme; and identifying or generating a transient pulse in the transient signal with a rise time of a leading edge of at most 0.5 ms and a duration of 1.3–1.8 ms.

88. A method according to claim 87, wherein the rise time of the leading edge is at most 0.4 ms.

89. A method of identifying or representing a phoneme "u" as in an English word "who", comprising the steps of:

deriving at most one transient signal corresponding to abrupt energy changes of the phoneme; and identifying or generating a transient pulse in the transient signal with a sine curve interpolation and a duration of 1.0–2.0 ms.

* * * * *